(12) United States Patent
Altberg et al.

(10) Patent No.: US 10,769,720 B2
(45) Date of Patent: *Sep. 8, 2020

(54) SYSTEMS AND METHODS TO GENERATE LEADS TO CONNECT PEOPLE FOR REAL TIME COMMUNICATIONS

(71) Applicant: THRYV, INC., D/FW Airport, TX (US)

(72) Inventors: Ebbe Altberg, Mill Valley, CA (US); Scott Faber, San Francisco, CA (US); Ron Hirson, San Francisco, CA (US); Sean Van Der Linden, Berkeley, CA (US)

(73) Assignee: Thryv, Inc., D/FW Airport, TX (US)

( * ) Notice: Subject to any disclaimer, the term of this patent is extended or adjusted under 35 U.S.C. 154(b) by 448 days.

This patent is subject to a terminal disclaimer.

(21) Appl. No.: 15/680,709

(22) Filed: Aug. 18, 2017

(65) Prior Publication Data

US 2018/0012294 A1 Jan. 11, 2018

Related U.S. Application Data

(63) Continuation-in-part of application No. 12/130,960, filed on May 30, 2008, now Pat. No. 9,767,510.
(Continued)

(51) Int. Cl.
*G06Q 30/08* (2012.01)
*G06Q 10/10* (2012.01)
(Continued)

(52) U.S. Cl.
CPC ............ *G06Q 30/08* (2013.01); *G06Q 10/10* (2013.01); *G06Q 30/02* (2013.01);
(Continued)

(58) Field of Classification Search
None
See application file for complete search history.

(56) References Cited

U.S. PATENT DOCUMENTS 6,442,529 B1 8/2002 Krishan et al.
6,501,832 B1 12/2002 Saylor et al.
(Continued)

OTHER PUBLICATIONS

United States Patent and Trademark Office, Office Action for U.S. Appl. No. 12/130,960, dated May 10, 2011, 15 pages, U.S.A.
(Continued)

*Primary Examiner* — Leland Marcus
(74) *Attorney, Agent, or Firm* — Greensfelder Hemker & Gale P.C.; Mark E. Stallion

(57) ABSTRACT

Methods and apparatuses to connect people for services delivered via real time communications and to optionally generate leads to new customers for the services. One embodiment includes: providing a communication reference to an entity for distribution to customers; establishing connections for real time communications between the entity and the customers in response to requests made via the communication reference; charging the customers on behalf of the entity using a process to establish the connections for a service of the entity provided to the customers over the connections; presenting the service of the entity to customers on behalf of the entity; charging the entity a first fee according to what the entity charges a customer for the service; and charging the entity a second fee according to a bid price specified by the entity in response to a determination that the presenting of the service leads to the customer.

22 Claims, 13 Drawing Sheets

Related U.S. Application Data

(60) Provisional application No. 60/948,379, filed on Jul. 6, 2007, provisional application No. 60/957,690, filed on Aug. 23, 2007.

(51) Int. Cl.
*G06Q 30/02* (2012.01)
*G06Q 30/04* (2012.01)
*G06Q 30/06* (2012.01)

(52) U.S. Cl.
CPC ..... *G06Q 30/0201* (2013.01); *G06Q 30/0283* (2013.01); *G06Q 30/0284* (2013.01); *G06Q 30/04* (2013.01); *G06Q 30/0601* (2013.01)

(56) References Cited

U.S. PATENT DOCUMENTS

| | | |
|---|---|---|
| 6,707,889 B1 | 3/2004 | Saylor et al. |
| 7,224,781 B2 | 5/2007 | Jacob et al. |
| 7,369,996 B2 | 5/2008 | Sladden |
| 7,428,497 B2 | 9/2008 | Agarwal et al. |
| 7,555,110 B2 | 6/2009 | Dolan et al. |
| 7,668,725 B2 | 2/2010 | Alston |
| 7,668,950 B2 | 2/2010 | Horowitz et al. |
| 7,876,886 B2 | 1/2011 | Altberg et al. |
| 8,027,878 B2 | 9/2011 | Wong et al. |
| 8,140,389 B2 | 3/2012 | Altberg et al. |
| 8,140,392 B2 | 3/2012 | Altberg et al. |
| 8,280,018 B2 | 10/2012 | Altberg et al. |
| 8,386,315 B1 | 2/2013 | Bala et al. |
| 8,687,783 B2 | 4/2014 | Altberg et al. |
| 8,856,075 B2 | 10/2014 | Rathod |
| 9,767,510 B2 | 9/2017 | Altberg et al. |
| 2002/0062393 A1 | 5/2002 | Borger et al. |
| 2002/0116256 A1 | 8/2002 | De Rafael et al. |
| 2003/0086556 A1 | 5/2003 | Welch, III et al. |
| 2003/0212759 A1 | 11/2003 | Wu |
| 2004/0098226 A1 | 5/2004 | Odachi et al. |
| 2004/0103041 A1 | 5/2004 | Alston |
| 2005/0044238 A1 | 2/2005 | Jacob et al. |
| 2005/0171838 A1 | 8/2005 | Eglinton |
| 2006/0277108 A1 | 12/2006 | Altberg et al. |
| 2010/0030734 A1 | 2/2010 | Chunilal |
| 2011/0078018 A1 | 3/2011 | Chunilal |
| 2011/0153413 A1 | 6/2011 | Chunilal |
| 2012/0158517 A1 | 6/2012 | Rathod |
| 2013/0268347 A1 | 10/2013 | Bala et al. |

OTHER PUBLICATIONS

United States Patent and Trademark Office, Office Action for U.S. Appl. No. 12/130,960, dated Nov. 23, 2011, 13 pages, U.S.A.
United States Patent and Trademark Office, Office Action for U.S. Appl. No. 12/130,960, dated Sep. 8, 2014, 14 pages, U.S.A.
United States Patent and Trademark Office, Office Action for U.S. Appl. No. 12/130,960, dated Jun. 25, 2014, 19 pages, U.S.A.
United States Patent and Trademark Office, Office Action for U.S. Appl. No. 12/130,960, dated Mar. 18, 2015, 17 pages, U.S.A.
United States Patent and Trademark Office, Notice of Allowance for U.S. Appl. No. 12/130,960, dated May 19, 2017, 10 pages, U.S.A.
United States Patent and Trademark Office, Office Action for U.S. Appl. No. 12/130,960, dated Jan. 12, 2017, 11 pages, U.S.A.
United States Patent and Trademark Office, Office Action for U.S. Appl. No. 12/130,960, dated Feb. 4, 2016, 6 pages, U.S.A.
United States Patent and Trademark Office, Office Action for U.S. Appl. No. 12/130,960, dated Jul. 2, 2017, 9 pages, U.S.A.
BusinessWire, "GoTo.com TeamsWith Netscape as Premier Search Provider for Popular Netscape Net Search," Jul. 1, 1999, p. 1356. Available at: http://www.thefreelibrary.com/jprint/PrintArticle.aspx?id=55045194.

Create Ad  [?] Help

Your ad is very important. Tell customers exactly what you're selling and why they should call you. Please review our Pay Per Call Ad Guidelines to ensure your ad is accepted and gets new customers calling your business today.

Ad Location Info

Business Name: [_____] (Sorry, no phone numbers)

☐ Use my Account Information

Address 1: [_____]

Address 2: [_____] (Optional)

City: [_____]

State: [-Select State- ▽]

Zip Code: [___]-[___]

Phone Number: ([___]) [___]-[___]  Enter the number where you'd like to receive calls Fax: ([___]) [___]-[___]

Ad Marketing Message

Millions of people online will see your ad. So, in line 1 write a strong headline explaining what you're selling. To get people calling your business, include a promotional offer in line 2. This encourages buyers to call you now! Please note: Line 1 and Line 2 must each a complete sentence. Tips for success
Examples of Promotional Offers:
- Call today and get $5 off.
- Free consultation – limited time.
- Call now and save 10%.

You'll be able to include more information about your offer on the business profile page. Learn more Marketing Message Line 1: [_____] (35 characters)

Marketing Message Line 2: [_____] (35 characters)

SYSTEMS AND METHODS TO GENERATE LEADS TO CONNECT PEOPLE FOR REAL TIME COMMUNICATIONS

CROSS-REFERENCE TO RELATED APPLICATIONS

The present application is a continuation-in-part of U.S. patent application Ser. No. 12/130,960, filed May 30, 2008, and claims priority to Provisional U.S. Patent Application Ser. No. 60/948,379, filed Jul. 6, 2007, and Provisional U.S. Patent Application Ser. No. 60/957,690, filed Aug. 23, 2007, the disclosures of each of which are incorporated herein in their entireties by reference.

TECHNOLOGICAL FIELD

At least some embodiments disclosed herein relate to communication connections in general and, more particularly but not exclusively, to connections for real time communications, such as connecting people for telephonic conversation, chat in text, voice and/or video, document sharing, screen-sharing, application sharing, etc.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, in one form of performance-based search advertising, an advertisement is included within a result page of a keyword search. Each selection ("click") of the advertisement from the results page is the measurable event for which the advertiser pays. In other words, payment by the advertiser is on a per click basis in such advertising.

BRIEF SUMMARY

Described herein are methods and apparatuses to connect people for services delivered via real time communications and to optionally generate leads to new customers for the services. Some embodiments are summarized in this section.

In one embodiment, a method includes: providing a communication reference to an entity for distribution to customers; establishing connections for real time communications between the entity and the customers in response to requests made via the communication reference; charging the customers on behalf of the entity using a process to establish the connections for a service of the entity provided to the customers over the connections; presenting the service of the entity to customers on behalf of the entity; charging the entity a first fee according to what the entity charges a customer for the service provided over a connection established between the customer and the entity; and charging the entity a second fee according to a bid price specified by the entity in response to a determination that the presenting of the service of the entity on behalf of the entity leads to the customer.

The present disclosure includes methods and apparatuses which perform these methods, including data processing systems which perform these methods, and computer readable media which when executed on data processing systems cause the systems to perform these methods.

Other features of the disclosure will be apparent from the accompanying drawings and from the detailed description which follows.

BRIEF DESCRIPTION OF THE SEVERAL VIEWS OF THE DRAWINGS

The present disclosure is illustrated by way of example and not limitation in the figures of the accompanying drawings in which like references indicate similar elements.

FIG. 2 illustrates a user interface for the creation of an advertisement according to one embodiment.

DETAILED DESCRIPTION

Figure 1:
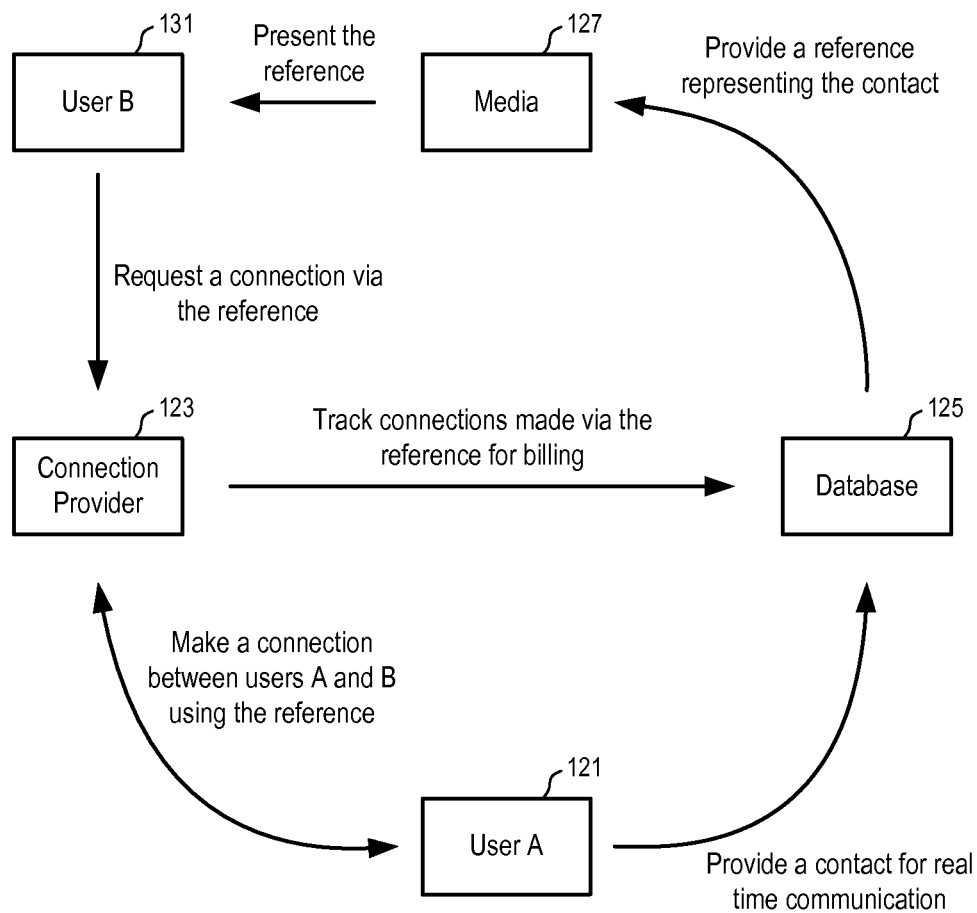
FIG. 1 shows a method to establish connections for real time communications according to one embodiment.

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

In one embodiment, a listing is presented to a user to provide the user with a communication reference, which can be used to request a connection for real time communications between the user and the entity of the listing, such as for telephonic conversations, instant messaging, chat in text, voice and/or video, screen sharing or application sharing, etc. The entity of the listing may be an advertiser who offers an advertisement fee for being presented, or a business entity, a seller, an advisor, an information provider, or a service provider, such as a provider for entertainment, amusement, etc. A listing may include text, graphical presentation, and/or audio or voice.

A listing may or may not be provided on behalf of an advertiser for a fee. For example, a directory service provider may compile listings of some businesses or sellers without the businesses or sellers explicitly request the directory service provider to advertise for them. A business or seller presented by a listing may or may not pay an advertisement fee for the presentation of the listing and/or for the lead to the customers resulting from the presentation of the listing.

For example, a community of users may create listings of businesses, sellers, etc. based on the recommendation of the users. In one embodiment, a listing can be created and edited by the community of users of telephonic apparatuses, such as softphones, cellular phones, or smart phones. The users can provide, edit, and/or modify a description, comments, ratings, etc., about a business or service provider that is identified by a telephonic reference, such as a telephone number of the business or service provider. Alternatively, the listings may have a portion of description that can be edited by the respective advertiser but not by other users. The listing database represents a business directory; and the entities represented by the listings may not pay any fee for being presented. Some of the entities may offer a fee for preferred placement in presentation. In one embodiment, the users may be charged a communication fee for communicating with the entities featured in the listings when the users use the softphones, cellular phones, or smart phones to communicate with the entities.

In one embodiment, an advertiser of an advertisement is charged an advertisement fee based on the performance of the advertisement (e.g., a telephonic connection to a customer, a lead for real time communication with a customer, a deal completed with the customer as a result of the performance, a subscription fee for a number of bundled leads or deals, etc.).

In one embodiment, a listing is provided to allow a customer to be connected to a seller; and the connection provider can charge the customer on behalf of the seller for transactions conducted over the connection provided between the customer and the seller. In one embodiment, the user terminals provided to the customer and the sellers are configured to charge the customer on behalf of the seller for the transactions. The customers and/or the sellers may also be charged for the communication connection. Alternatively, the communication connection may not be charged explicitly; and the communication cost can be covered via the commission fees for charging the customer on behalf of the seller and/or the advertisement fees.

In one embodiment, a presented listing includes a telephonic reference, which is used to identify an "end point" on a telephonic network for a telephonic connection to the "end point". The telephonic network may be a circuit switched network, or a packet switched network, or a combination of one or more circuit switched networks and one or more packet switched networks. For example, the telephonic reference may be a telephone number with an extension, a telephone number without an extension, a session initiation protocol (SIP) uniform resource identifier (URI), a user identifier of an instant messaging network, a user identifier of a Voice over Internet Protocol (VoIP) network, or a user identifier of a peer to peer VoIP network, etc.

In one embodiment, the telephonic references presented in some of the listings are references assigned by a connection server such that, when the references are used, the connection server is in the path of a call for a connection between the caller and the callee. For example, the connection server may be requested to call back the caller and to call the callee separately to connect the caller and the callee according to an assigned reference. For example, the connection server may receive a call, as an end point specified by an assigned reference, and then further connect the call to the callee based on the assigned reference used to receive the call. For example, the connection server may be queried to provide a telephonic reference of the callee according to an assigned reference to allow the caller's device to initiate the call to the callee using the provided reference. For example, the connection server may decrypt or decode an encrypted/encoded phone number of the callee for the caller's device and track the calls made by the caller's device through the decrypting or decoding process.

For example, in one embodiment, when an assigned reference is used to call for connections, the user is connected to a connection server as an end point. The connection server determines the communication reference of the advertiser based on the assigned reference used to connect the user and the connection server and then further connects the user to the advertiser. Through the use of the assigned reference, the connection server is in the path of connecting the user and the advertiser to track the connection made via the advertisement.

For example, the assigned reference can be a telephone number of the connection server, which when called by the user can be used to determine the telephone number of the advertiser; and the telephone number of the advertiser can be used to further connect the call to the advertiser. For example, the assigned reference may be a reference to request a callback to the user to connect to the advertiser. For example, the assigned reference can be an identifier of the advertiser, such as a user ID of the advertiser, a SIP URL of the advertiser, etc. The assigned reference can be passed to the connection server in a call signaling message of a VoIP call, be used to request a server to resolve the reference into a direct reference for use in a network, or be used to report to a server about the call to the advertiser.

In another embodiment, the telephonic references for some of the listings are designed to be used on telephonic apparatuses which are configured to track the calls made via the telephonic references and/or to report the calls made via the telephonic references. Thus, information about the calls made via the telephonic references can be used at a server to bill advertisers per connections made via the advertisements, to charge the customers on behalf of advisers (or sellers, service providers), to compensate partners based on the call activities, etc In a further embodiment, the telephonic references for some of the listings are designed to be used on telephonic apparatuses which are configured to maintain account information, or to communicate with servers of financial institutions to bill advertisers, and/or charge the customers on behalf of advisers, sellers or service providers.

In one embodiment, the user terminals that are designed to make the connections via the advertisement use the assigned reference to track the connections and report to a server the connection made via the advertisement. For example, softphones can be designed to make direct connections over a peer to peer network, without going through a centralized connection server. The softphones can be configured to report the calls made via the advertisements to a server for tracking. Alternatively, the softphones may be configured to deduct fees, or transfer funds, via accounts maintained by the softphones, or accounts accessible individually by the softphones.

In one embodiment, a click to call button includes a reference to the callee, which when selected, causes a telephonic apparatus used by the user, such as a softphone, a cellular phone, or a smart phone, to start a process to call the callee. The reference to the callee may be a SIP address of a connection server encoded with a phone number of the callee, which can be decoded by the connection server to further connect the call to the callee. The reference to the callee may be an encrypted phone number of the callee, which is to be decrypted by a server to allow the telephonic apparatus to call the callee directly (e.g., via a peer to peer network). In one embodiment, the reference can further include parameters such as the search terms used to locate the listings, the time stamp of the search, an electronic coupon/promotion, a bid price for advertisement fee, and/or a price for the service offered by a seller, etc. In one embodiment, the telephonic apparatus is configured to report a call resulted from the advertisement to a server for tracking and/or billing purposes.

In another embodiment, a click to call button is designed to request a connection server to call back to the customer for a connection to the entity of the listing. The click to call button may cause the presentation of an interface to guide the customer through the calling processing and/or to collect a callback reference from the customer (e.g., via a web page). In some embodiments, the callback reference, such as the telephone number of the customer, can be determined automatically from the identity of the customer, or the identity of the device used by the customer. For example, a telephone number of the customer can be looked up from the account of the customer after the customer is authenticated.

In one embodiment, a telephonic apparatus is a softphone implemented at least in part via software, such as an instant messenger, a VoIP client application running on a computer, an applet embedded in a web page, a built-in or plug-in module of a web browser, a handheld device, a personal digital assistant, a cellular phone, a cordless phone, a Bluetooth phone, a WiFi phone, etc. The telephonic apparatus may be designed to make a connection based on Internet Protocol, based on a peer to peer network, based on software, and/or based on a connection to a server or a host computer, etc. In some embodiments, the telephonic apparatus is implemented via hardwire circuitry, such Application-Specific Integrated Circuit (ASIC); in some embodiments, the telephonic apparatus is implemented partially via special purpose hardwire circuitry and partially via software, such as Application-Specific Integrated Circuit (ASIC) or Field-Programmable Gate Array (FPGA) with software/firmware; and in some embodiments, the telephonic apparatus is implemented using a set of general purpose hardwire components that are under the control of software.

FIG. 1 shows a method to establish connections for real time communications according to one embodiment. In FIG. 1, user A (121) provides a contact for real time communication, such as a telephone reference of the user A. The contact can be used to establish a connection with user A (121) through a communication network. For example, the contact can be a telephone number of a landline, traditional analog telephone, a cellular phone number, a phone number with an extension, a Universal Resource Identifier (URI) such as a Session Initiation Protocol (SIP) URI, a user identifier of a VoIP application, a user identifier of an instant messaging system, etc.

The contact of the user A (121) is stored in the database (125); and a reference is assigned to represent the contact. Instead of providing the contact to customers, the reference representing the contact is provided through the media (127) to user B (131). Thus, when the user B (131) uses the reference to request a connection with the user A (121), the connections resulted from the advertisement can be tracked to evaluate the performance.

In one embodiment, advertisements can be distributed via a number of media channels operated by a number of demand partners. The reference can also be assigned to identify the demand partners and/or the media channels used to distribute the advertisements. In one embodiment, the information obtained from tracking the demand partners who are responsible for the delivery of a communication lead is used to compensate the demand partner for each delivered communication lead. Alternatively, the demand partners may be compensated according to the advertisement presentations made for the advertiser; and tracked information can be used to determine the performance and/or the cost effectiveness of the media channels.

In one embodiment, the reference can be presented via a variety of media channels, such as a virtual reality environment, newspaper, magazine, telephone directory, web search results, VoIP user terminals, interactive maps, banners, directory assistance service, online marketplace, mobile communication devices, radio, cable/satellite television, interactive television, web television, voice portal, web portal, online auction site, blog, email, bulletin board, refrigerate magnet, brochure, etc.

In FIG. 1, the user B (131) can use the reference obtained from media (127) to request the connection provider (123) to establish a connection or facilitate a communication channel for real time communications between the user A (121) and the user B (131). The connection provider uses the database (125) to determine the contact of the user A (121) and then make a connection between the user A (121) and user B (131) using the contact of the user A (121). Alternatively, the reference may include an encoded/encrypted version of the contact of the user A (121) which can be decoded/decrypted without relying upon the database (125).

In response to the user B's request for a connection, the connection provider (123) may establish two separate connections to the user A (121) and the user B (131) and then bridge the two connections to connect the user A (121) and user B (131). For example, the connection provider (123) may determine the reference from a connection established between the user B (131) and connection provider (123) and then further bridge the connection to the user A (121).

In one embodiment, the connection provider (123) may provide a separate reference to represent the user B (131) and allow the user A (121) to subsequently callback to the user B (131) via the reference that represents the user B (131), if the user A (121) is not currently available for real time communications. The connection provider (123) may schedule an appointment for the user A (121) and user B (131) for a real time communication session. The connection provider (123) may send a notification to the user A (121) to inform the user A (121) about the request for a real time communication.

Alternatively, the user terminal of the user B (131) may provide the encoded/encrypted version of the contact of the user A (121) to the connection provider for a decoded/decrypted version of the contact of the user A (121) just in time when the user terminal of the user B (131) is ready to make a direct connection with a user terminal of the user A (121). For example, the user terminal of the user B (131) can use the decoded/decrypted contact of the user A (121) to make a peer to peer connection with the user terminal of the user A (121) without going through the connection provider (123); and providing the decoded/decrypted contact can be considered a proxy event of a connection between the user terminal of the user B (131) and the user terminal of the user A (121). Alternatively or in combination, the user terminal of the user B (131) and/or the user terminal of the user A (121) can be configured to report to the connection provider the connection between the user terminals. For example, a reporting message may include a call detail record (CDR), indicating the time period of the connection.

In one embodiment, the connection provider (123) tracks the connections made via the reference for billing for the advertisement. For example, the connection provider (123) may charge the advertiser for each communication lead deliver to the user A (121).

A communication lead may be limited to a distinct, separate customer such that repeated calls from the same customer within a predefined time period may not be counted as separate communication leads. In one embodiment, the communication lead may also be limited by the duration of a communication session, such that a short session having a duration shorter than a predefined time period may not be counted as a communication lead, and/or a long session having a duration longer than a predefined time period may be counted as more than one communication lead.

In one embodiment, a number of communication leads may be bundled as a package for a subscription fee, or a bid price. Further, the delivery of communication leads may be bundled with an offer of a telecommunication service package. Alternatively, the advertiser may specify a bid price that is to be charged for each communication lead delivered, or a bid limit (e.g., maximum bid) which is to be resolved into an actual bid based on the bid prices of competitors in a category for a specific geographic service area.

FIG. 2 illustrates a user interface for the creation of an advertisement according to one embodiment. The user interface may be presented via web in a web browser.

In FIG. 2, an interface (141) allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, an audio and/or visual advertisement is generated based at least in part on the information submitted by the advertiser via the user interface (141) (e.g., for presentation via virtual realty, directory assistance service, search result, etc.)

In one embodiment, a short audio advertisement is generated based on the concise marketing message (e.g., two sentences, each having a length limit, such as 35 characters). The concise marketing message can be read by a human to generated a recorded audio file for a short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. In response to a request from the customer, the visual component of the advertisement can be sent to the customer via an SMS message, via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web or a virtual reality environment, the short audio advertisement can also be included; and the audio advertisement can be played automatically or after the user selects the advertisement.

In FIG. 2, the interface (141) may be implemented as a web page. Alternatively, an advertisement may submit the advertising content via a custom client application, or via a message gateway (e.g., an instant message, an email, an SMS message, etc.). In one embodiment, one or more advertisements can be uploaded into a server via a spreadsheet, or via a web service interface.

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer, or a human announcer) when the audio advertisement is needed. In one embodiment, the machine synthesized audio recording are stored in the database for a period of time and deleted if not used after a predetermined period of time, or when the usage of the audio advertisement is lower than a threshold.

Figure 3:
FIG. 3 illustrates a user interface for the creation of a listing according to one embodiment.

FIG. 3 illustrates a user interface for the creation of a listing according to one embodiment. In FIG. 3, an entity can create a listing of service that can be delivered via a real time communication connection, such as a telephonic connection. The interface (143) allows the entity to specify a listing name with tags that can be used to categorize the listings and/or to facilitate searching. For example, the tags of the listing can be used to match with the search criteria of a customer, the content of document in which the listing is to be presented, etc.

In FIG. 3, the interface (143) allows the entity (e.g., an advisor, an entertainer, an information provider, a consultant, etc.) to specify the price of the service offered by the entity. For example, the entity may allow a customer to talk to the entity for free for a period of time specified in the entry box (145), or allow an indefinite period of free communication time. For example, the entity may request the customer to accept a charge after a period of free time, or request the customer to accept a charge before being connected to the entity. For example, the entity may request the customer to accept a per minute price before the customer is being connected to the entity for real time communication. Alternatively, the entity may provide a period of free communication time to the customer for a taste of the service, before requiring a per minute price specified in the interface (143).

In FIG. 3, the entity can also specify a price for a specified period of time, such as $25.00 for 30 minutes and a policy to continue beyond the 30 minutes. For example, the entity may request $25.00 for each additional 30 minutes in a communication session, or request the system to end the call after the initially purchased 30-minute communication session, or no long charge the customer if the customer wishes to continue the conversation beyond the initially purchased 30-minute communication session.

In one embodiment, the entity can specified a set of multiple prices for different purchase options; and the entity can negotiate with a customer during an initially free communication time period to select a price.

Alternatively, the entity may be compensated according to a flat rate specified by the system for services provided to the customers of the system.

Figure 4:
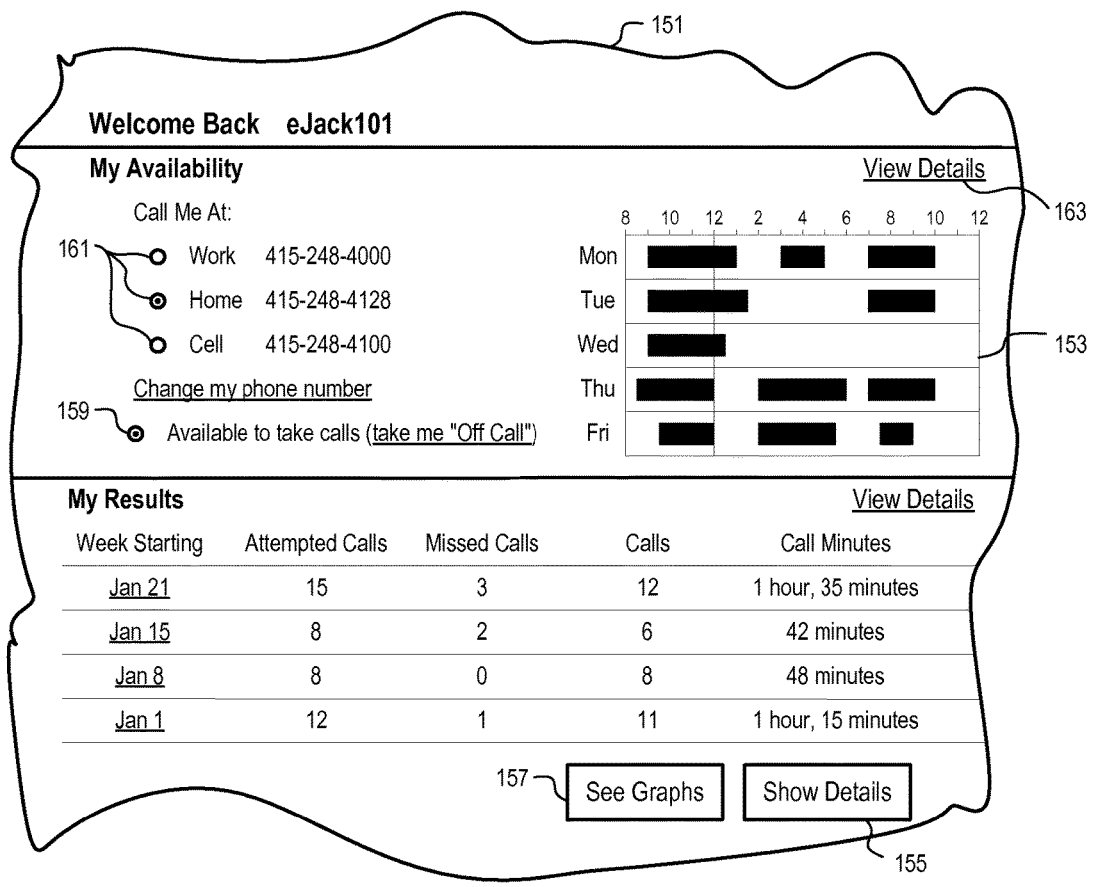
FIG. 4 illustrates an example of a user interface to manage availability for receiving phone calls according to one embodiment.

FIG. 4 illustrates an example of a user interface to manage availability for receiving phone calls according to one embodiment. An advertiser may specify the day and time of availability for accepting the calls for real time communications. Based on the availability, the system may schedule the presentation of the advertisements/communication references more effectively and block unwanted calls.

In one embodiment, the system can store multiple phone numbers of the seller. The system can intelligent route a call to the seller according to the preference of the seller. For example, in FIG. 4, the advertiser/seller may choose a preferred phone number from a set of phone numbers of the seller to receive incoming calls using the option group (161) in the user interface (151). The seller may indicate whether the seller is currently available to take calls or is to be taken "off call" (e.g., using the check box (159)).

In one embodiment, the owner of the listing (e.g., seller, advertiser, advisor, entertainer, consultant, etc.) can request the system to make concurrent calls to the multiple phone numbers. The owner of the listing can use any of the telephonic apparatuses connected at the multiple phone numbers to answer the call.

For example, an advertiser may have multiple telephonic apparatuses at different telephonic references. A connection server can assign a telephonic reference to an advertisement of the advertiser. When a customer calls the connection server at the telephonic reference assigned to the advertisement, the connection server can further connect the call from the customer to the advertiser via multiple concurrent calls to the different telephonic references of the advertiser. Thus, the advertiser can take the call to talk to the customer via any of the multiple telephonic apparatuses of the advertiser.

In one embodiment, during the conversation between the customer and the advertiser, the advertiser may request the connections server to reconnect the call to a different telephonic apparatus. For example, the connection server can place one or more separate concurrent calls to the telephonic references that are currently not in use for the conversation between the customer and the advertiser and then join the separate calls with the existing calls in a conference. This allows the advertiser to switch from one phone to another during the conversation and to bring family, friends, colleagues and/or third parties into the conversation.

In one embodiment, separate concurrent calls can be placed to the telephonic references of the advertiser that are specified prior to the customer's call, such as specified via the user interface (151). Alternatively, the advertiser can request a separate call to a telephonic reference specified in the request during the conversation with the customer. For example, the advertiser may provide the telephonic reference of a third party to invite the third party to join the conversation.

In one embodiment, the system is configured to drop the other concurrent calls when the one of the concurrent calls is answered. Thus, the first answering telephonic apparatus is selected for the connection, although multiple concurrent calls were initially placed.

In one embodiment, when multiple telephonic apparatus of the customer (or the advertiser) are answered substantially at the same time in response to the concurrent calls, one of the answering telephonic apparatus is selected for the connection while the others are disconnected. The selection can be performed based on a set of predefined priorities among the telephonic references, or based on statistics data about past answered calls. For example, the frequencies of the calls being answered on the multiple telephonic references can be used to select the telephonic apparatus that most frequently answered the previous concurrent calls (e.g., previous concurrent calls within the same time window of the day as the current call). For example, the telephonic apparatus that most recently answered the prior concurrent calls can be selected for the current connection request. Alternatively, a random selection from the answering devices can be used to select telephonic apparatus for the current connection request.

In one embodiment, the multiple telephonic references of the advertiser are called for up to a predetermined period of time to allow one or more of the multiple concurrent calls being answered. One or more answered calls can be joined with the call (or calls) with the other party in a conference. This provides a convenient mechanism to set up a conference call among multiple persons between the customer and the advertiser.

Alternatively, the multiple telephone numbers of the advertiser can be called sequentially to connect the advertiser to the customer.

In one embodiment, the system allows the seller to specify the schedule to receive calls; and the schedule (153) is displayed to the seller in a graphical way to help the seller to manage calls. In FIG. 4, the user interface (151) includes a link (163) which can be selected to display a user interface (not shown in FIG. 4) to manage the schedule (153).

In one embodiment, when the schedule or the check button (159) indicates that the advertiser/seller is currently not available to take calls for real time communications, the system can decrease the priority of the advertisement for this advertiser, or stop temporarily the presentation of advertisements for this advertiser. When there is a call intended for the advertiser at a time when the advertiser is not taking calls (e.g., according to the schedule), the system can block the call, or direct the call into a voice mail for the advertiser, or arrange a call at an alternative time, or obtain a callback number to allow the advertiser to initiate a callback to the customer.

In FIG. 4, the user interface (151) also includes a summary of call activities. Buttons (157 and 155) can be selected to show graphical representation of the call activities and further details of the call activities.

As the phone calls pass through the system, a wide array of information can be collected and tracked, including day/date/time of calls, duration of calls, call status (answered, no answer, busy), inbound phone numbers, etc. Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call or a single lead.

As the phone calls pass through the system, a wide array of information can be collected and tracked, including day/date/time of calls, duration of calls, call status (answered, no answer, busy), inbound phone numbers, etc. Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call or a single lead.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is willing to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

Figure 5:
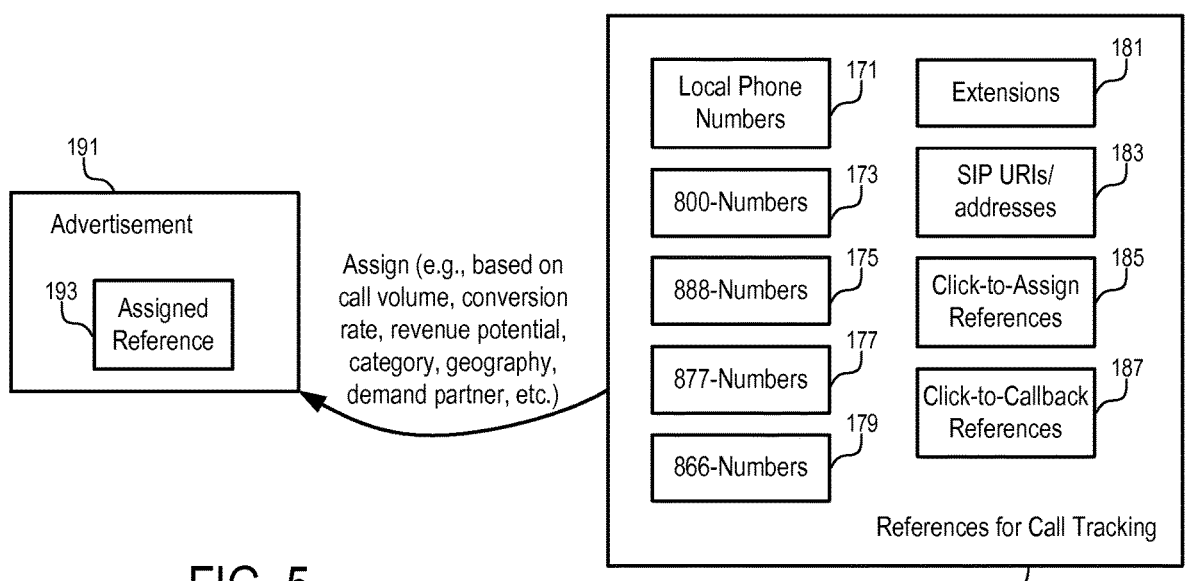
FIG. 5 shows a diagram illustrating a method to select a type of tracking mechanism with a corresponding reference for embedding in an advertisement according to one embodiment.

FIG. 5 shows a diagram illustrating a method to select a type of tracking mechanism with a corresponding reference for embedding in an advertisement according to one embodiment. In FIG. 5, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 5, a pool (189) of different types of references is maintained, such as local phone numbers (171), 800-numbers (173), 888-numbers (175), 877-numbers (177), 866-numbers (179). Some of the references can be dynamically generated and used, such as extensions (181), SIP addresses (183), click-to-assign references (185) and click-to-callback references (187). In one embodiment, one or more of the references are selected and used as the assigned reference (193) that is embedded in the advertisement (191). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a media channel, a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner or to a web browser of a customer). For example, the tracking mechanism used in an advertisement that is to be presented via a particular demand partner can be upgraded or downgraded based on the statistical data collected from the past activities related to the advertisement.

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further interface (e.g., a web page, a dialog box, etc.) can be displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. For instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement being called is estimated based on the type of media channels used to present the advertisement, the demand partner responsible to deliver the advertisement, and/or the customer who views the advertisement. Any characteristics in advertising that have an impact on the likelihood of an advertisement being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 6:
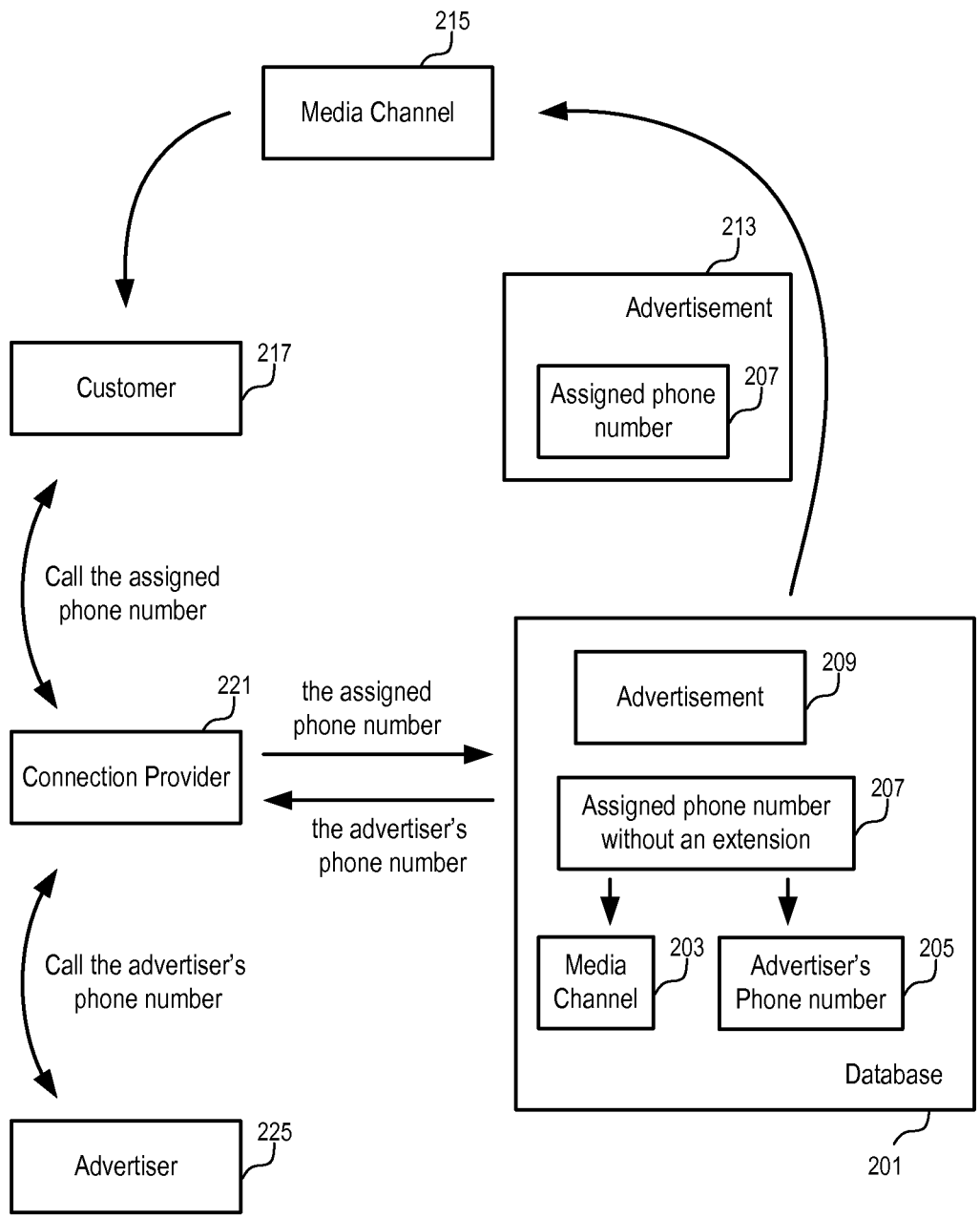
FIG. 6 illustrates an example of telephone call tracking mechanisms which can be selected according to one embodiment.

FIG. 6 illustrates an example of telephone call tracking mechanisms which can be selected according to one embodiment.

In FIG. 6, a phone number (207) without an extension is assigned for the generation a particular version (213) of an advertisement (209). In the database (201), the assigned phone number (207) is associated with the media channel (203) and the advertiser's phone number (205) (and/or other parameters to be tracked). Thus, the parameters to be tracked can be identified based at least partially on the assigned phone number (207). The particular version (213) of the advertisement (209) that has the assigned phone number (207) is provided to the customer (217) via the media channel (215). The advertisement may instruct or suggest the customer to call the assigned phone number (207) to reach the advertiser. In response to the advertisement, the customer may call the assigned phone number (207). When the connection provider (221) is called at the assigned phone number via a telephone carrier, the connection provider (221) can identify the assigned phone number (e.g., via a Dialed Number Identification Service (DNIS)) and determine the advertiser's phone number (205) based at least partially on the assigned phone number (207). Further, using the assigned phone number, it can also be determined that the phone call from the customer is a response to an advertisement that is delivered via the media channel (215) based on the association between the assigned phone number (207) and the media channel (203) in the database (201).

In one embodiment, after determining the advertiser's phone number from the assigned phone number that is dialed by the customer (217), the connection provider (221) makes a separate call to the advertiser (225) via a telephone carrier. When both the customer (217) and the advertiser (225) are on the line with the connection provider (221), the connection provider (221) can bridge or conference the calls to connect the customer (217) and the advertiser (225). Alternatively, the connection provider (221) may forward the calls from the customer (217) to the advertiser (225) after determining the advertiser's phone number.

In one embodiment, the assigned phone number can be a phone number that is local to the area to be served by the advertisement. Alternatively, the assigned phone number can be a toll free phone number, such as an 800- (888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Since maintaining different phone numbers may increase the tracking cost, another type of tracking mechanism uses different extensions to differentiate tracked parameters. For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

In one embodiment, after the customer dials the root number, the customer is connected to an IVR system or a human operator of the connection provider/tracker. After the customer provides the extension to the IVR system or the human operator, the tracked parameters, such as the media channel and/or the advertiser's phone number, can be determined.

In one embodiment, the IVR system or the human operator can prompt the customer for the extension that is provided in the advertisement. When the dialed root number is sufficient to identify information about the media channel, the IVR system or the human operator may customize the prompt to include the information of the media channel and ask the customer to further provide the extension to reach the desired advertiser. When the dialed root number is sufficient to identify information about the advertiser, the IVR system or the human operator may customize the prompt to include the information of the advertiser and ask the customer to further provide the extension to reach the desired advertiser.

The extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database. Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, the connection provider calls the customer instead of providing a phone number to receive a phone call from the customer. For example, the reference assigned to represent the contact of the advertiser may not be used to make a call via a traditional telephone carrier. The reference can be submitted to the connection provider via a data communication, such as an email, an SMS message, a web request, or other types of data communication. The reference can be used as a key in the database to look up the associated parameters, such as the media channel and the advertiser's phone number. In one embodiment, the reference is an encoded/encrypted version of the associated parameters, such that an authorized data system can decode/decrypt the information without having to look up from the database. After the reference is provided to the connection provider with the request for a connection, the connection provider can callback to the customer to establish the connection between the customer and the advertiser. The request may include a callback phone number of the customer. Alternatively, a customer may be prompted to provide the callback phone number in response to the request. The connection provider can connect the customer and the advertiser by calling the customer and the advertiser separately and bridge/conferences the calls, or by forwarding one call (e.g., the call to the customer) to another (e.g., to the advertiser).

In one embodiment, a telephone number assigned to a version of an advertisement includes a SIP address for the initiation of a VoIP-based telephone call. The SIP address can be used for a manually dialed call on a SIP-enabled phone, or be used in a click to call format. In one embodiment, the SIP address includes an encoded/encrypted version of the contact of the advertiser such that the connection provider can decode/decrypt the contact of the advertiser from the SIP address without having to look up from database.

In one embodiment, the allocation of a telephone number to an advertisement is deferred to a stage when a customer is interested in the advertisement and ready to make a phone call. A reference embedded in the advertisement can be used to specifically request for the telephone number that is assigned to the advertiser by the connection provider. The request can be sent as a web request in response to a click on a link, or as an email, an SMS message, or an instant message. The assigned telephone number may be a toll free phone number without extension, a local phone number with an extension, a SIP URL, etc. Alternatively, the reference can be used to request the actual phone number of the advertiser.

Figure 7:
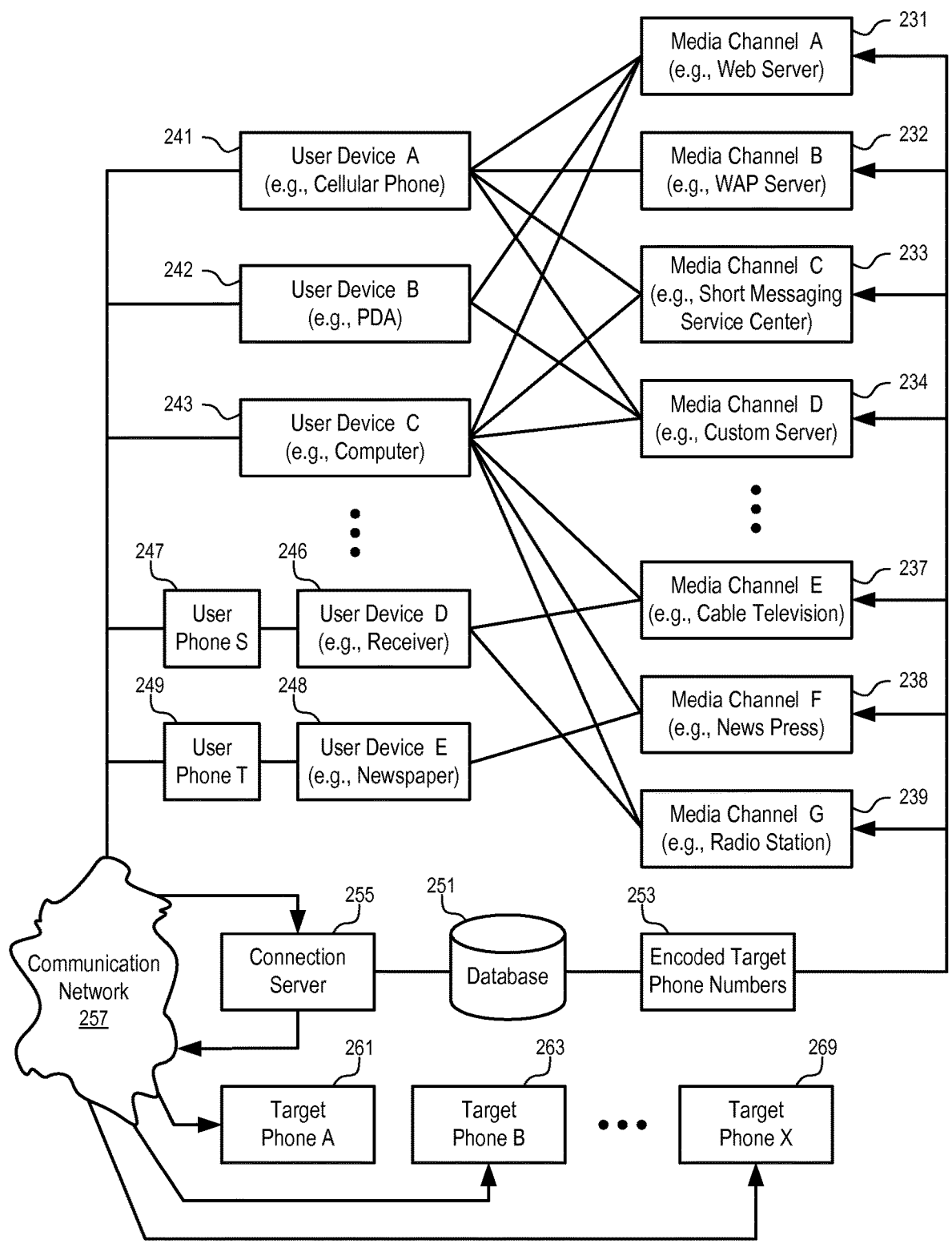
FIG. 7 shows a diagram of a system to make and track phone connections according to one embodiment.

FIG. 7 shows a diagram of a system to make and track phone connections according to one embodiment. In FIG. 7, a database (251) may contain the phone numbers of target phone A (261), target phone B (263), . . . , target phone X (269), etc. Typically, the target phones belong to the institutions, businesses, individuals, etc, which seek for publicity through various media channels, such as media channel A (231) (e.g., web server), media channel B (232) (e.g., WAP server), media channel C (233) (e.g., short messaging service center), media channel D (234) (e.g., custom server), media channel E (237) (e.g., cable television), media channel E (238) (e.g., news press), media channel G (239) (e.g., radio station), and others such as virtual reality, directory assistance service, interactive maps, etc.

In one embodiment, the phone numbers of the target phones are not directly publicized over the media channels. Instead, encoded target phone numbers (253) are used. Using the encoded target phone numbers (253), a user cannot reach target phones directly. The encoded target phone numbers (253) allow the association of additional information with the target phone numbers, such as the media channels used, special promotions, etc.

The encoded target phone numbers are delivered with content information (e.g., web page, WAP page, short message, television programs, news articles, virtual reality, etc.) to user devices, such as user device A (241) (e.g., cellular phone), user device B (242) (e.g., personal digital assistant (PDA)), user device C (243) (e.g., computer), user device D (246) (e.g., receiver), user device E (248) (e.g., newspaper).

In one embodiment, a user device can include a USB phone, a Bluetooth wireless phone, or one or more speakers or headphones with one or microphones for the implementation of a software based phone (softphone).

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. In one embodiment, the user devices/phones support the display of virtual reality.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (247) or user phone T (249).

In one embodiment, dialing at least a portion of an encoded target phone number connects the phone call to a connection server (255) first. According to the encoded target phone number dialed, the connection server (255) determines the corresponding target phone number using the database (251) and connects the phone call to the corresponding target phone (e.g., one of target phones 261-269) through the communication network (257).

Note the communication network (257) may be circuit switched, packet switched, or partially circuit switched and partially packet switched. For example, the telephone network may partially use the Internet to carry the phone call (e.g., through VoIP). For example, the connection between the user phone/device and the connection server (255) may be carried using VoIP; and the connection between the connection server (255) and the target phone may be carried using a land-line based, circuit switched telephone network.

In one embodiment, the information associated with the encoded target phone number, such as the media channel used to provide the encoded target phone number to the users, is also decoded/retrieved using the database (251). Thus, the information associated with the encoded target phone number can be tracked/stored.

In one embodiment, the connection server (255) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the connection server (255). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the connection server (255) through the communication network (257); and a second portion of the encoded target phone number is to be decoded by the connection server (255). For example, the Dual Tone Multi-Frequency (DTMF) decoder can be installed in the connection server (255) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the connection server (255) for different target phone numbers; and the portion of the encoded target phone number that is used to reach the connection server (255) is not used in determining the information associated with the encoded target phone number.

Alternatively, multiple telephone numbers can be used to reach the connection server (255); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (251) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the connection server (255). When such a mapping scheme is used, a look up table is not necessary. For example, an encoded target phone number may include a first portion that is the phone number of the connection server (255), a second portion that is the target phone number appended with a number mapped from an identifier of the media channel. To prevent the user from dialing the target phone number directly, an encryption/scrambling scheme can be used to encode the second portion, which is decoded at the connection server (255).

In one embodiment, the connection server (255) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the connection server (255), pauses for a short period of time for the connection server (255) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 7, the user device initiates the phone call. Alternatively, a connection server may be used to initiate phone calls both to the user device (or a separate user phone) and the target phone and then join/bridge the phone calls to connect the user to the target phone. For example, when the user selects the encoded target phone number, the selection of the target phone number is transmitted to the connection server with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the connection server. Alternatively, the content information can be formatted so that the selection is sent directly to the connection server.

When the connection server starts the phone calls, the encoded target phone number can also include alphabetic characters (and/or other characters). The connection server can decode the encoded target phone number to recover/ retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the connection server connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the connection server.

For example, a toll-free number is published to advertise mortgage brokers in a particular geographic area. When a consumer dials the toll-free number, the call is routed to the highest bidding mortgage broker who is available in that market.

The connection server may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 8:
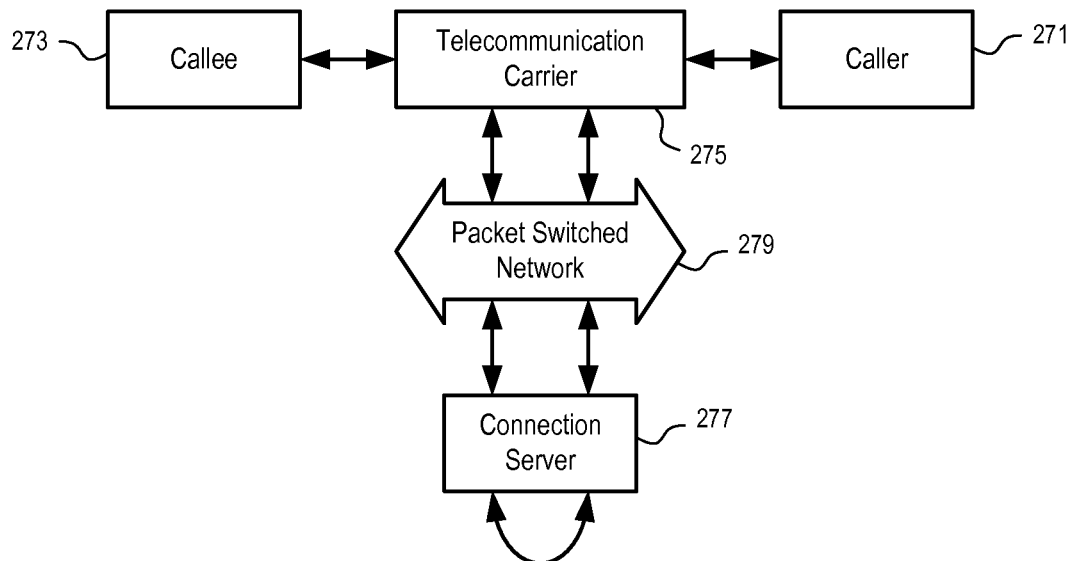
FIG. 8 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 8. In FIG. 8, the connection server (277) receives and/or places telephone calls via the telecommunication carrier (275) over the packet switched network (279). The telecommunication carrier (275) further routes the telephone communications towards the caller (271) and the callee (273).

Since the telecommunication carrier (275) can route a call from a packet switched network to a variety of destinations (e.g., a traditional analog telephone set, a mobile phone, a cellular phone, a WiFi phone, a Bluetooth phone, a softphone running on a computer, etc.), the connection sever (277) can use one type of communication connection with the telephone carrier (275) to facilitate the communication connections with variety of devices used by the customers (e.g., callers and callees). Thus, the implementation of the connection server (277) can be simplified. In one embodiment, the connection server (277) can also place and/or receive direct VoIP calls to/from the caller (or callee).

For example, to make a voice connection in response to a click-to-call request, the connection server can place separate VoIP calls, via the telecommunication carrier (275), to the caller (271) (e.g., the requester of the click-to-call) and the callee (273) (e.g., the destination of the click-to-call request).

If the caller (271) (or the callee 273) is on a public switched telephone network (PSTN), the telecommunication carrier (275) bridges the packet switched the network and the public switched telephone network (PSTN). The telecommunication carrier (275) routes the call from the packet switched network (279) to the caller (271) (or the callee 273) on the circuit switched network. Thus, the caller (271) (or the callee 273) can use a telephone set to receive the call via a Plain Old Telephone Service (POTS). The connection server (277) joins the separate calls that are placed via the packet switched network (279) to connect the callee (273) and the caller (271).

In one embodiment, call signaling and media content may use different network paths. While call signaling is arranged to go through the packet switched network (279) and the connection server (277), the media stream does not have to go through the connection server (277). For example, when the calls are joined, the media content may be redirected to flow over the communication carrier (275) without going through the packet switched network (279) to the connection server (277) for improved performance and efficiency. The connection server (277) can release the control over the media stream to allow the media stream to flow through the shortest path, without going through the connection server, while maintaining control to the connection for the call by staying on the path for call signaling.

In another example, when the caller (271) initiates a call over a PSTN to the connection server (277), the telecommunication carrier (275) converts the call for the packet switched network (279) for the connection server (277).

In one embodiment, virtual softphones on the telecommunication carrier (275) are assigned to the caller (271) and the callee (273) for interfacing with the connection server (277) over the packet switched network (279). The virtual softphones encapsulates the devices and networks used by the caller (271) and callee (273) to access the connection server (277); and the telecommunication carrier (275) shields the connection server (277) from the implementation details of the user devices and networks used by the caller (271) and the callee (273). The connection server (277) calls (or receives calls from) and connects the virtual softphones on the telecommunication carrier (275) to connect the caller (271) and the callee (273).

In FIG. 8, the telephone connection between the telecommunication carrier (275) and the connection server (277) is facilitated via a packet switched network (279). Thus, the connection server (277) can operate efficiently in a digital domain. The connection server (277) interfaces with the telecommunication carrier (275) using one type of Internet Telephony systems (e.g., SIP-based Internet telephony).

Alternatively, a connection server may include some or all of the functionality of the telecommunication carrier (275). For example, the connection server may be configured to bridge a packet switched network and a circuit switched network. The connection server may support multiple, different types of Internet Telephony systems.

In one embodiment, the connection server (277) and the telecommunication carrier (275) are operated by different, separate entities. Alternatively, the connection server (277) and the telecommunication carrier (275) may be operated by the same entity. In another embodiment, the telecommunication carrier (275) includes a set of facilities operated by a number of separate entities.

In one embodiment, the caller (271) and/or the callee (273) may also place/receive calls via a packet switched network. The telecommunication carrier (275) may route the calls between the caller (271) and the callee (273) without using a PSTN. In one embodiment, caller (271) and/or the callee (273) may place calls to or receive calls from the connection server (277) via Internet.

Figure 9:
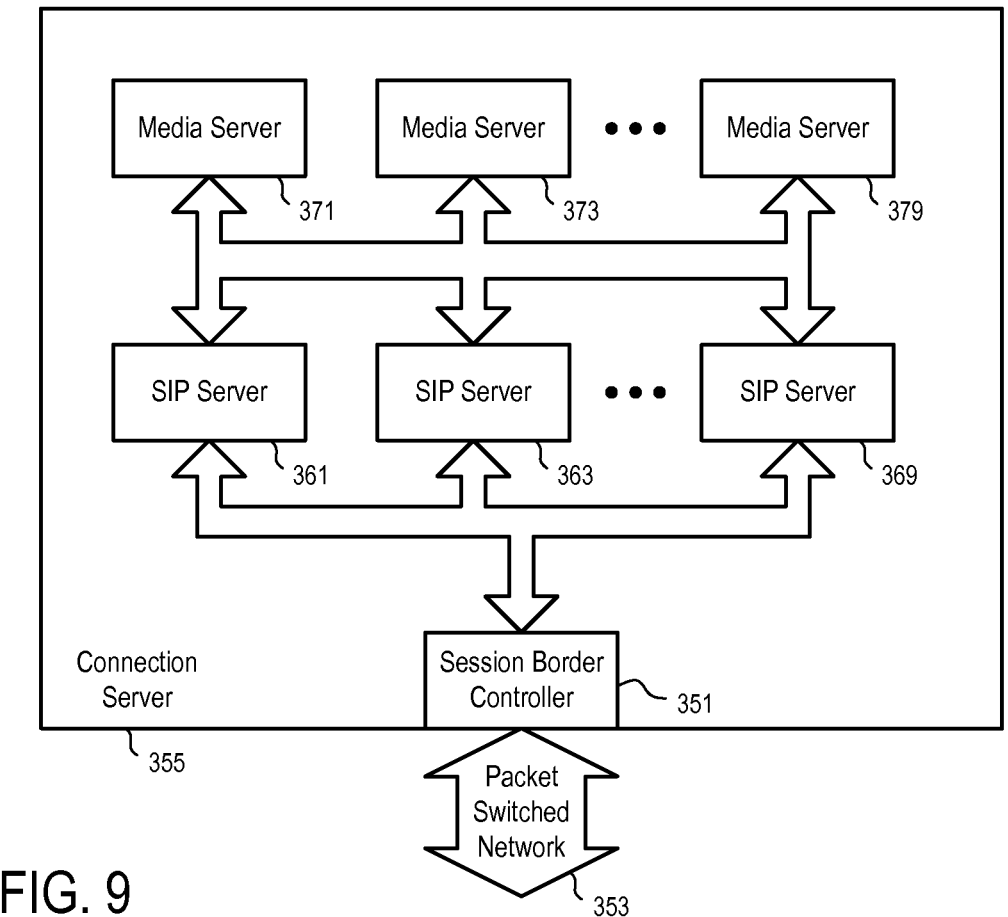
FIG. 9 shows a connection server according to one embodiment.

FIG. 9 shows a connection server according to one embodiment. In FIG. 9, the connection server (355) is configured to place and/or receive VoIP calls using Session Initiation Protocol (SIP). A session border controller (351) is used to interface with the packet switched network (353) and control the types of network traffic related to VoIP calls that might go into the connection server (355).

In one embodiment, the session border controller (351) is configured to control the signaling and media stream during the setting up, conducting and tearing down of VoIP calls to or from the connection server (355). In some embodiments, the session border controller (351) may pick up the call that comes to the session border controller (351), places a separate call from the session border controller (351), and joins the received call and the placed call to control both the signaling and media stream. In some embodiments, the session border controller (351) may perform signaling/encoding translation to allow the connection server (355) to process the VoIP calls in one standard, while receiving VoIP calls in a variety of standards (e.g., SIP, H.323, etc.). In one embodiment, the session border controller (351) is configured to perform one or more firewall functionalities, such as denial of service protection, call filtering, bandwidth management, etc.

In one embodiment, the session border controller (351) is configured to perform media releasing operation. When the session border controller (351) determines that the source and destination of a media stream is on the same side of the session border controller (351) (e.g., both the source and the destination of the media stream is outside the connection server 355), the session border controller (351) can release the hairpinning of the media stream and allow the media stream to flow without going through the session border controller (351).

In FIG. 9, a set of SIP servers (e.g., 361, 363, . . . , 369) are networked to the session border controller (351) to receive messages for incoming calls and to initiate outgoing calls. The session border controller (351) is configured to evenly distribute the calls for processing by the SIP servers.

For example, when an incoming message for the initiation of a call is received (e.g., a SIP INVITE message from the telecommunication carrier 275), the session border controller (351) may route it to a SIP server (e.g., 361) for processing. The INVITE message includes the phone number dialed by the caller and the contact information about the caller (e.g., the phone number of the caller 271 and/or the identity of the virtual SIP phone at the telecommunication carrier 275).

The SIP server may determine whether the phone number dialed by the caller (273) is sufficient to determine the phone number of the callee (e.g., 273). If the phone number of the callee (e.g., 273) can be determined from the phone number dialed by the caller (273) (e.g., via decoding the phone number dialed by the callee, or looking up the phone number of the callee from a table using the phone number dialed by the caller as a key), the SIP server can place a separate SIP call to the callee via the packet switched network (353) and then connect the caller and the callee. Alternatively, the SIP server can further route the SIP INVITE message (e.g., to the telecommunication carrier (275) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identify a media server (371) (or a virtual softphone on SIP server) as the initiator for a separate call. The SIP server then connects the calls for the media stream.

In one embodiment, the caller is first connected to a media server (e.g., 371, 373, or 379). For example, the SIP server may forward the SIP INVITE message to one or more of the media servers for answering the call. When a media server (e.g., 371) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (351) into the connection server (355). For example, the media stream can go through the telecommunication carrier (275) in FIG. 8 without going to the connection server (277) after the SIP server connects the caller and the callee.

However, the SIP server stays on the signaling path to monitor the progress and termination of the call. The SIP server can also break the connection between the caller and the callee, or force the media stream to come through the connection serve (355). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (353) for a connection to the caller. The SIP call may be bridged onto a circuit switched network (e.g., by a telecommunication carrier 275). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (361, 363, . . . , 369) and media servers (371, 373, . . . , 379) are implemented on separate computers connected via a local area network (and/or intranet or Internet). Alternatively, at least the some of the servers can be implemented on a same computer. In one embodiment, the SIP servers and the media servers are also integrated with the session border controller (351) on a same data process system having multiple processors coupled with a data bus. In one embodiment, the SIP servers are coupled to the media servers via a network; and a SIP server may use any of the available media servers for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (355) may further include a database server (355) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figures 10, 11:
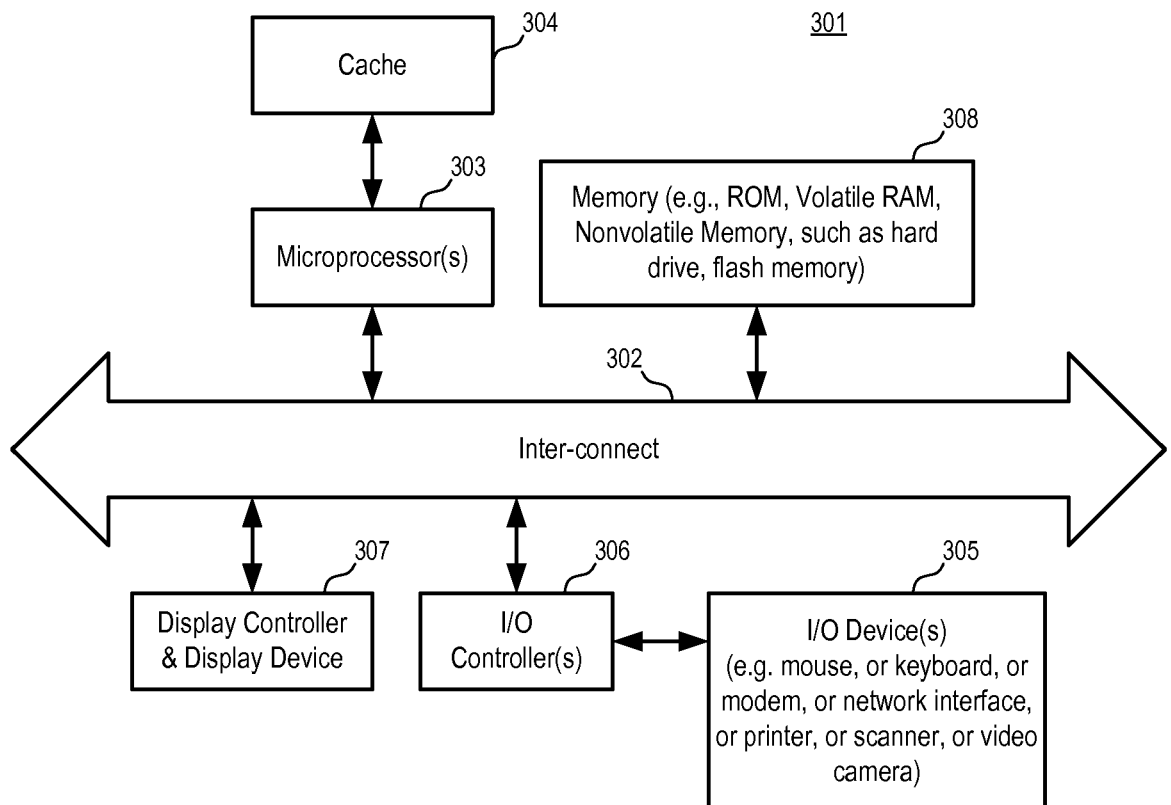
FIG. 10 shows a block diagram example of a data processing system which may be used in various embodiments.
FIG. 11 shows a user interface to arrange a callback to connect a caller to a callee for real time communications according to one embodiment.

FIG. 10 shows a block diagram example of a data processing system which may be used in various embodiments. While FIG. 10 illustrates various components of a computer system, it is not intended to represent any particular architecture or manner of interconnecting the components. Other systems that have fewer or more components may also be used.

In FIG. 10, the communication device (301) is a form of a data processing system. The system (301) includes an inter-connect (302) (e.g., bus and system core logic), which interconnects a microprocessor(s) (303) and memory (308). The microprocessor (303) is coupled to cache memory (304) in the example of FIG. 10.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 10 is used as one of the communication server(s), connection server(s), database server(s), media server(s), controller(s), router(s), gateway(s), etc. In some embodiments, one or more servers of the system can be replaced with the service of a peer to peer network of a plurality of data processing systems, or a network of distributed computing system. The peer to peer network, or a distributed computing system, can be collectively viewed as a server data processing system.

A user terminal as a client system can be a data processing system similar to the system of FIG. 10. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

In one embodiment, a user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. Other types of traditional communication client(s) may be used in some embodiments.

FIG. 11 shows a user interface to arrange a callback to connect a caller to a callee for real time communications according to one embodiment. For example, when the user selects a click to call reference, the user interface as illustrated in FIG. 11 can be presented.

In one embodiment, if the user has already signed in, the callback references (e.g., telephone number, user ID, etc.) can be obtained automatically from the user account and filled in the entry boxes (323 and 329) for confirmation by the user. In one embodiment, the user terminal (e.g., a softphone, a cellular phone, etc.) can automatically determine the one or more callback references of the user; and the automatically determined callback reference can be used to pre-fill the entry boxes (323 and 329) for confirmation by the user. Alternatively, when the callback references can be determined via the automated process, the system may initiate the connection process without displaying the interface as illustrated in FIG. 11.

In one embodiment, if the user has already signed in, the callback references (e.g., telephone number, user ID, etc.) can be obtained automatically from the user account and filled in the entry boxes (323 and 329) for confirmation by the user. In one embodiment, the user terminal (e.g., a softphone, a cellular phone, etc.) can automatically determine the one or more callback references of the user; and the automatically determined callback reference can be used to pre-fill the entry boxes (323 and 329) for confirmation by the user. Alternatively, when the callback references can be determined via the automated process, the system may initiate the connection process without displaying the interface as illustrated in FIG. 11.

In one embodiment, when the callee is available for real time communications with the user, the connection provider can call the phone number of the user to provide a connection between the user and the callee.

In one embodiment, when the advertiser is available to talk to the customer, the connection server can connect to the customer via multiple concurrent callbacks to the telephonic references of the customer. Thus, the customer can take the callback to talk to the advertiser via any of the multiple telephonic apparatuses of the customer. The system may connect the first answered callback to the advertiser and drop the other callbacks, or allow the customer to pick up more than one callback for a conference call.

In one embodiment, the connection server can initiate multiple concurrent callbacks to the customer and multiple concurrent calls to the advertiser to connect the customer and the advertiser. In one embodiment, the connection server receives a call from the customer and initiates concurrent calls to the advertiser to connect the customer to the advertiser. In one embodiment, the connection server establishes a connection with the advertiser and then initiates multiple concurrent callbacks to the customer to connect the customer to the advertiser.

In one embodiment, multiple concurrent calls are initiated from the user terminal of the customer or from the user terminal of the advertiser. The multiple concurrent calls may include one or more calls for peer to peer connections without going through a connection server.

In one embodiment, multiple calls can be initiated in the user terminal of the customer, or the user terminal of the entity of the listing. For example, when a link or icon button in an advertisement displayed on the softphone (or a mobile phone or smart) of the customer is selected, the softphone can be instructed to initiate multiple concurrent calls to the advertiser based on the multiple references embedded in the link or the icon button. In another example, the advertiser is provided with a message to call back the customer; and the message can include a link or icon button to cause the phone of the advertiser to initiate multiple concurrent callbacks to the customer. In one embodiment, the phone is instructed to make connection with the first answered one of the concurrently placed calls. Alternatively, the phone is instructed to establish a conference for all answered calls.

In one embodiment, a reference to the user request is provided to the advertiser/advisor to allow the advertiser/advisor to initiate the connection with the user for real time communications. For example, the system may send a message to the advertiser/advisor, including the reference to the user, to inform the advertiser/advisor that the user is interested in a callback within the time window specified by the user. The message can be sent via an email, an instant message, an SMS text message, a voice mail, a phone call, etc.

In FIG. 11, the user may further optionally provide a comment in the text field (325) to get the attention of the advertiser/advisor. In one embodiment, the comment provided in the text field (325) is sent to the callee (e.g., advertiser, advisor or seller) with the notification of the request. For example, when the callee is notified via a telephonic connection, the comment can be provided via a text to speech module. For example, when the callee is notified via a visual message, the comment can be included as text.

In FIG. 11, a visual interface is provided to a user to specify a callback number and a time window. Alternatively, the user may call a phone number assigned to the seller to specify the callback numbers and the time window and to record a voice message for the seller. The phone number can be a phone number local to the user, a toll free number (e.g., 1-800-Call-Bob), a telephone number with an extension, a SIP URI, an instant messaging user identifier, a VoIP user identifier, a user identifier of a peer to peer voice communication network, a member name, a click-to-call reference, a reference to a phone number, an Internet address for a voice connection, etc. When the phone number assigned to the seller is called by the user, the call is connected to a connection provider which prompts the user to specify a callback number, a time window, a voice message, if the seller is not immediately available to communicate with the user. In one embodiment, the connection server automatically determines the number of the user (e.g., via an automatic number identification (ANI) service) and ask the user to confirm the use of the number as the callback number. Alternatively, the callback number can be determined from the preference setting of the user, after the user is authenticated over the phone connection.

Figure 12:
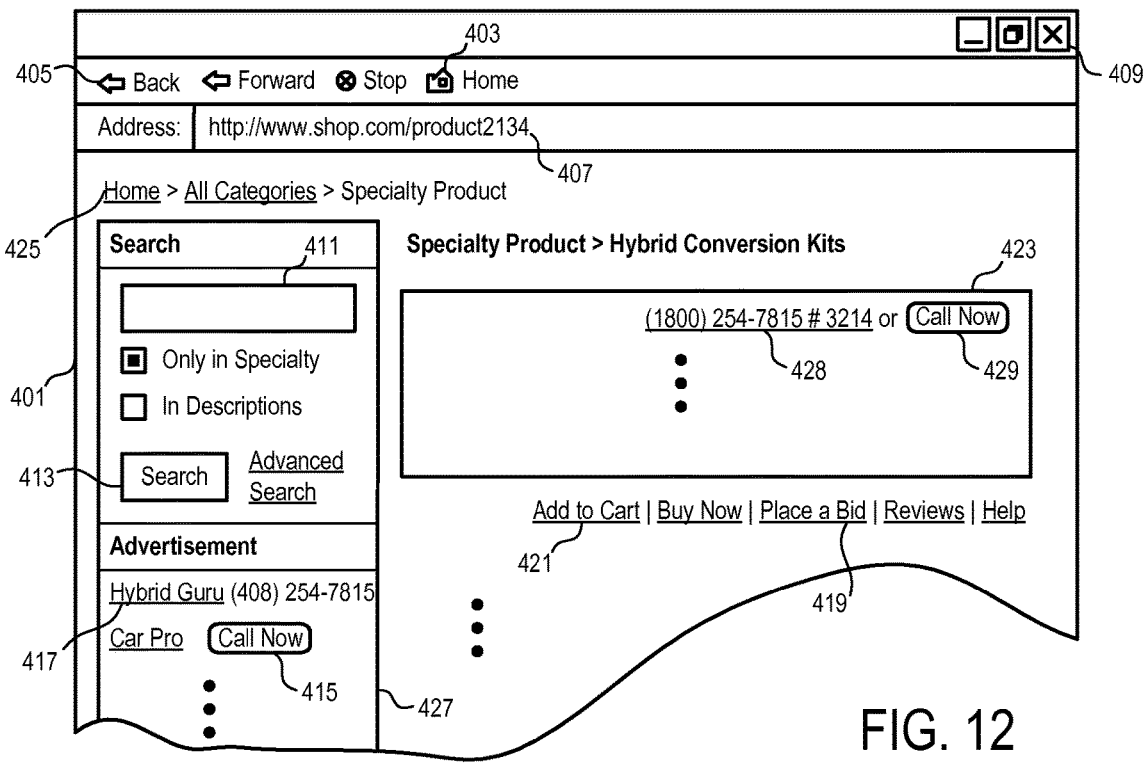
FIG. 12 illustrates an example of presenting information to connect people for real time communications according to one embodiment.

FIG. 12 illustrates the presentation of a document in a web browser (401). The components of the document may include one or more files retrieved by the web browser (401) from one or more servers over a network connection, and/or from a local file system. The servers may be on different domains on the Internet or within the same domain (or web site).

In one embodiment, the document is identified by the address specified in the entry box (407). The file at the location identified by the address may include links to other files at different addresses, which are loaded into the browser as components of the document. Thus, the file retrieved from the address specified in the entry box (407) can be considered as the root file that provides instructions to dynamically assemble the document for presentation in the browser window (401).

The document presented in the web browser (401) can include static content and/or dynamic content. For example, the document can include scripts or applets that dynamically generate content based on interactions with the user. The document may include multimedia streams (e.g., a video or audio stream), a static graphical image, entry fields, and/or selection boxes, etc.

In FIG. 12, the user may select the icon (409) to close the browser window (401) without going to a next document. The user may select one of the navigation buttons (e.g., 405, 403) to go a previously viewed document, with or without refreshing or reloading the previously viewed document. The user may enter a new address in the entry box (407) to visit a new document. The user can enter a search term in the entry box (411) inside the document and select the search button (413) to request a new search result. The user may select a link (417) or an icon button (415) of an advertisement presented in the document to exit the web site. The user may select a link (e.g., 425, 421, 419) embedded in the current document to load a new document without leaving the web site.

In FIG. 12, the document presented in the browser window (401) represents an e-commerce environment for selling a product (or service). The document may be implemented via a sells widget for presenting a listing of the product (or service) in the area (423) of the browser window (401). In one embodiment, the listing (423) includes an icon button (429) which is selectable to request a call back for a connection with the seller, or to initiate a call (e.g., via a VoIP module embedded in the browser window (401), or via a standalone telephonic module accessible via the browser window (401)).

In FIG. 12, the listing (423) also includes a telephonic reference (428) which can be used to call the connection server using a separate telephonic device for a connection to the seller via the connection server. For example, the customer can dial the telephone number (428) on a telephone separate from the device showing the browser window (401) to initiate a request for a connection to the seller. Although a telephone number of a connection server with an extension for the advertisement is illustrated in FIG. 12 as the explicitly displayed telephonic reference, other types references can also be used, such as a SIP URI, a user identifier of an instant messaging network, a VoIP user identifier, a toll-free number without an extension, a local number with or without extension, etc.

In some embodiments, the icon button (or hyperlink) is provided to allow the user to request the connection to the seller via click to call, without explicitly displaying the telephonic reference (428). In some embodiments, the telephonic reference (428) can be provided without an icon button (or hyperlink) for click to call. In some embodiments, the icon button (or hyperlink) for click to call (or click to dial) can be provided with an explicit presentation of the telephonic reference (428), as illustrated in FIG. 12.

In FIG. 12, the user may select the link (421) to register the product (or service) (e.g., adding the product to an online shopping cart) for a subsequent purchase transaction, or select the link (419) to place a bid in an online auction of the product (or service). For example, the user can select the "Buy Now" link to request a web page to complete a purchase transaction. For example, the user can select the "Reviews" link to request a web page of feedback, comments, recommendations, or suggestions that are provided by prior customers of the product (or service). For example, the user can select the "Help" link to request help information about the sells widget and/or a purchase transaction.

In FIG. 12, the document presented in the browser window (401) includes advertisements (427) that may be relevant to the product (or service) presented in the area (423). For example, the advertisements may include the listings of advisors who offer to provide advice, information, consultation, comments, suggestions relevant to the product (or service) presented in the area (427). The advisors may charge a fee for the service rendered over the communication connection established via the advertisement. In one embodiment, the user may request an initially free connection with the advisor; and after a period of time, the advisor may request payment from the user.

For example, when the user is connected to the advisor via a connection server (e.g., via using the telephonic reference of the connection server assigned temporarily to the advisor to request the connection), the advisor may request the connection server to charge the user on behalf of the advisor to continue the conversation after an initial free period of consultation. In one embodiment, the user may be required to pre-pay the advisor before being connected by the connection server to the advisor for a real time conversation in person.

For example, the user may be connected to the advisor via a peer to peer network, using a softphone, or an instant messaging application, which may be a standalone application or a built-in or plug-in module or an applet of a web browser. When a centralized server is not used in making the connection, the user terminal, such as the softphone or the instant messaging application can be configured to report the transaction to a centralized server for the payment processing, or process the payment via the accounts maintained on the user terminals, or to access accounts via the user terminals to process the payment.

Alternatively or in combination, the advertisements presented in area (427) may include the listings of an advertiser who offers similar products or services as the product (or service) presented in the area (423). Alternatively or in combination, the advertisements may include the listings of an advertiser who offers products or services related to the product (or service) presented in the area (427), in a way that user who are interested in the product (or service) presented in the area (423) are likely interested in these related products or services.

In one embodiment, the advertisements presented in the area (427) include references assigned to the advertisers (e.g., advisors, sellers, etc.). The assigned references can be used to request connections with the respective advertisers for real time communications.

In one embodiment, an advertiser is charged an advertisement fee per a connection with a customer established via the advertisement for real time communications. In one embodiment, an advertiser is charged a commission fee when the customer is charged for a transaction over the connection established via the advertisement. In one embodiment, an advertiser is charged an advertisement fee per a presentation of the advertisement. In other embodiments, a combination of fees can be collected for the advertisement, or a subscription can be charged for the advertisement. Alternatively, the advertisements can be presented without a charge.

In one embodiment, an advertisement fee is charged for the advertisement or listing presented in the area (427) or area (423) when the user is connected to the advertiser for real time communication. The advertisement fee may be an amount specified by the advertiser, or by the advertising system. In the embodiment, the advertisement fee is determined based on a bid for maximum price specified by the advertiser and the closest bid of the competitor of the advertiser.

In one embodiment, the operator of the web site (407) is compensated per the connection established via the advertisement.

In one embodiment, when an assigned reference is used to call for connections, the user is connected to a connection server as an end point. The connection server determines the communication reference of the advertiser based on the assigned reference used to connect the user and the connection server and then further connects the user to the advertiser. Through the use of the assigned reference, the connection server is in the path of connecting the user and the advertiser to track the connection made via the advertisement.

For example, the assigned reference may be a telephone number of the connection server, which when called by the user can be used to determine the telephone number of the advertiser; and the telephone number of the advertiser can be used to further connect the call to the advertiser. For example, the assigned reference may be a reference to request a callback to the user to connect to the advertiser. For example, the assigned reference may be an identifier of the advertiser, such as a user ID of the advertiser, a SIP URL of the advertiser, etc. The assigned reference can be passed to the connection server in a call signaling message of a VoIP call, be used to request a server to resolve the reference into a direct reference for use in a network, or be used to report to a server about the call to the advertiser.

In one embodiment, the user terminals designed to make the connections via the advertisement can use the assigned reference to track the connection and report the connection to a server for the connection made via the advertisement. For example, softphones can be designed to make direct connections over a peer to peer network, without going through a centralized connection server. The softphones can be configured to report the calls made via the advertisements to a server for tracking. Alternatively, the softphones may be configured to deduct fees, or transfer funds, via accounts maintained by the softphones, or accounts accessible individually by the softphones.

Although FIG. 12 illustrates various types of information presented in the document, the disclosure is not limited to the specific combination illustrated in FIG. 12. More or less information or different types of information can be presented in the document. In some embodiments, the documents are presented in the web browser; in other embodiments, the documents can be presented via other types of application programs, such as a spreadsheet, a word processor, a document editor, etc. In one embodiment, the document is presented on an apparatus which has the capability to establish the connections for real time communications, such as a softphone, or a cellular phone or a PDA based phone.

Figure 13:
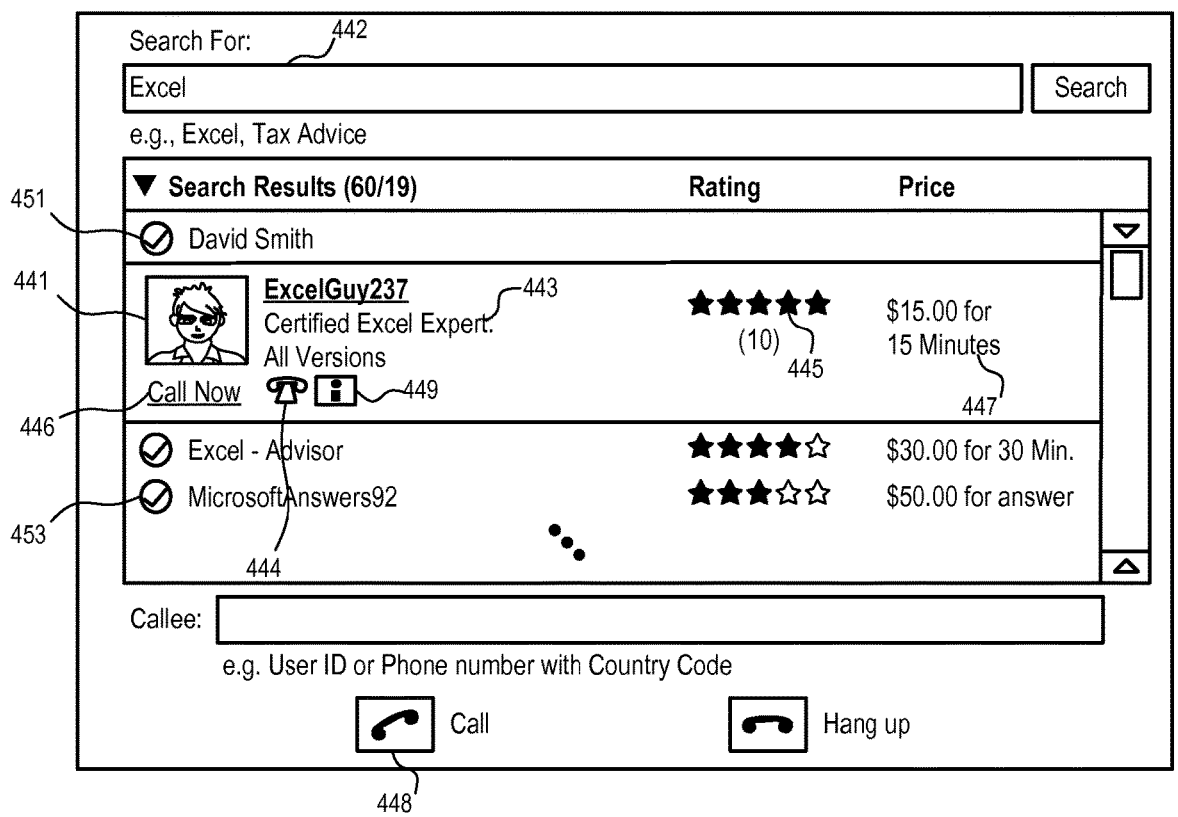
FIG. 13 shows an example of presenting a list of references on a telephonic apparatus according to one embodiment.

FIG. 13 shows an example of presenting a list of references on a telephonic apparatus according to one embodiment. In FIG. 13, the user may enter one or more key words (e.g., "Excel") in the search box (442) under the heading "search for" to indicate the requirement for the search.

FIG. 13 the search result includes one listing (451) from the personal address book of the user, one or more listings (e.g., 441) from a fee-based advisor database, and some listings (e.g., 453) from a business listing database.

In one embodiment, some top positions in the list of search results are reserved for listings retrieved from certain sources (e.g., address book and/or the advertisement database). For example, up to a first number of top positions can be reserved for the listings obtained from the personal address book; and up to a second number of next top positions can be reserved for listings from the advertisement database; and other listings can be mixed in the remaining positions of the list based on a ranking indicator, such as the earning potential for presenting the listings, the degree of matching to the search criteria, availability of the callee to communicate in real time at the time of the presentation of the listings, ratings of the customers, the prices of the sellers, etc.

In another embodiment, the priorities of the different sources are represented by different weights for sorting the results in a unified way. For examples, a ranking indicator may be evaluated based on a function of the earning potential, the degree of matching to the search criteria, and real time availability of the callee, and/or other considerations. To sort the listings from different sources in a unified way, the earning potential, the degree of matching to the search criteria, real time availability of the callee, and/or other considerations can be modified with a weighting factor assigned according to the priority of the source of the listing before being used in the ranking function to compute the ranking indicator.

In another embodiment, the search results are limited to a specific source. Alternatively, listings from different sources can be presented in separated areas designated for the different sources.

In one embodiment, when a listing is selected, an expended entry is displayed for the listing. For example, an expanded advisor entry shows a photo image (441) of the advisor, a description (443) of the expertise of the advisor, the rating (445) based on the experience of prior activity of the advisor, the price (447), etc.

In one embodiment, the expanded entry further includes an information icon (449), which can be selected to provide a profile page about the advisor. For example, the profile page may include the expertise of the advisor, the rate, a detailed description, social connections, and/or previous consumer feedback information, such as rating, comments, recommendations, etc.

In FIG. 13, the expanded entry includes a call icon (444) which can be selected to initiate a call to the advisor. Alternatively, the user can call the advisor via selecting the "call now" link (446) of the listing, or selecting the call button (448) while the listing is being selected/highlighted. In FIG. 13, the telephonic reference of the advisor is not displayed in the listing; and the user is encouraged to call via the telephonic apparatus. Alternatively, the telephonic reference of the advisor can also be displayed for the listing; and the user has the option to use a different telephonic apparatus to place the call.

In one embodiment, the appearances of the call buttons or links are rendered based on whether the advisor (seller or advertiser) is currently scheduled to receive calls. If the call buttons or links are presented during a non-callable time period of the callee, such as when the current time is outside the scheduled hours for receiving calls or when the callee is currently off calls, the appearances of the call buttons or links are rendered to indicate that the callee is not currently available for real time communications; and the call buttons or links cannot be activated to call the callee. When the callee is not currently available for real time communications, the call buttons or links can be activated to schedule an appointment or request a callback.

FIG. 13 illustrates examples of visual interfaces for presenting the listings. Alternatively, the listings can be presented via an audio portal. For example, a user can call a phone number of a connection server for an interactive voice response system (IVR), which receives user specified search criteria and presented the search results obtained from different sources in a combined list.

In one embodiment, a connection provider maintains a number of listings for sellers (e.g., experts, entertainers, advisors, information providers, etc.) who offer services over communication connections established by the connection provider. The sellers may specify their own rates for charging the customers. The connection provider charges the customers on behalf of the sellers according to the rates specified by the sellers and the lengths of the time periods during which the services are offered over the communication connections. For example, the connection provider may charge the customers' credit cards, debit cards, bank accounts, or member debit accounts that the customers pre-established with the connection provider. The connection provider retains a portion of the fees, charged to the customer on behalf of the sellers, and sends a portion of the fees to the sellers. For example, the connection provider can retain a pre-determined percentage of the customer spending as commission fees and send the remaining portion to the seller.

In one embodiment, the connection provider also advertises/promotes the listings for the sellers to generate leads to new customers, or new transactions with existing customers. The connection provider may charge a separate advertisement fee for selectively advertising the listings of the sellers. For example, selected listings may be presented in a section designed for the presentation of featured listings, where other listings are presented with less preferred placement positions.

In one embodiment, the connection provider presents featured listings with preferential placement in a media channel. The connection provider may select featured listings based on a set of predetermined criteria, including the availability for real time communications with customers at the time the listings are about to be presented, a rating based on customer feedbacks that is above a threshold value, etc. Thus, the featured listings provide a listing of quality sellers.

In one embodiment, the sellers of the featured listings may or may not offer an advertisement fee for the preferential placement. The connection provider selects the featured listings based also on a value indicator that includes the consideration of possible income generated from presenting the featured listings as advertisements and the consideration of possible future income generated from transactions resulted from the presentation of the advertisements.

In one embodiment, a formula is used to evaluate the value of a listing, considering the seller's bid price for placement, the potential revenue generated from transactions resulted from the placement of the advertisement, the conversion rate of the listing for generating events for which an advertisement fee can be charged, and the conversion rate of the listing for generating paid transactions resulted from the advertisement. Depending on the business objective, the value formula can be modified by varying the weighting of the short-term revenue (e.g., the advertisement fee) or the weighting of the mid/long-term revenue (e.g., the first transaction resulted from the advertisement or future transactions resulted from advertisement). In one embodiment, the value formula can be customized for a specific media channel that is used to deliver the advertisement (e.g., audio portal, web, interactive voice response (IVR) system, yellow page, search engine, directory assistance, etc.) and/or for a specific type of users (e.g., registered user or unregistered user), or for a specific user. For example, the conversion rate and/or the amount of average customer spending can be computed based on the characteristics of media channel and/or the user of the media channel.

The value formula can be used by the connection provider to determine the listings/advertisements/sellers that the connection provider wishes to feature in order to maximize its revenue now or in the future.

In one embodiment, a value formula is used to compute the weighted average of an indicator of the advertisement earning potential and an indicator of the transaction earning potential. The weights for the indicators can be changed according to the business goal to emphasize the short term revenue, or the mid/long term revenue.

In one embodiment, the indicator of the advertisement earning potential is computed from multiplying the advertisement fee by the rate of converting from advertisement presentation to an event chargeable for the advertisement fee. For example, when the bid price specified by the seller/advertiser is charged based on a qualified click event, the bid price can be multiplied by the conversion rate for converting from featured listing impression (presentation) to qualified clicks. For example, the number of qualified clicks generated from the listing being presented as a featured listing during a period of time and the number of times the listing being presented as a featured listing during this period of time can be counted to compute the conversion rate.

In one embodiment, the click conversion rate is computed from statistical data for a specific listing, or for a category of listings.

In one embodiment, the click conversion rate is based on a position normalized count of presentations. For example, a listing featured at the top position may have a higher click conversion rate than the same listing featured at the second position. Based on statistic data collected from the specific listing, or an average of a category of listings, or an average of listings of a variety of categories, the ratios between the click conversion rates for different positions can be obtained. The ratios can be used to normalize the number of presentations in which the listing is presented in various different positions. For example, the number of presentations of the listing as presented in the second position can be multiplied by the ratio between the click conversion rate for being presented at the top position and the click conversion rate for being presented at the second position to obtain an equivalent number of the presentations of the listing at the top position, from the conversion point of view. Thus, the conversion rate computed from the position normalized count of presentation represents a position normalized conversion rate; and the indicator of advertisement earning potential computed from the position normalized conversion rate represents a position normalized indicator of advertisement earning potential.

In one embodiment, a qualified click on a listing includes a selection of a link embedded in the listing by a customer who has provided payment information to the connection provider, such as credit card information, debit card information, bank account information, a member debit account of the customer, etc. The customer may provide the payment information after the selection of the link, or before the selection of the link. The system may verify that the customer has provided payment information before or after the selection of the link.

For example, a registered user may be authenticated before the featured listings are presented to the user. Once the registered user clicks/selects a link embedded in a featured listing presented after the authentication, the click/selection can be considered as a qualified click. The link embedded in the featured listing may be a link to a detailed description of the listing. In one embodiment, the detailed description is hosted on a web sited of the connection provider. Alternatively, the detailed description may be hosted in a web sited of the seller. The link embedded in the featured listing may also be a link which when selected presents a user interface to facilitate a callback to the user to connect the user with the seller (e.g., for real time communications with the seller, or for listening to a pre-recorded message from the seller). For example, the user interface may collect a callback telephone number from the customer, or confirm the use of telephone number of the customer that is on file with the connection provider. The link embedded in the featured listing may also be a link which when selected presents a user interface to facilitate electronic mail communications between the user and the seller.

For example, a user may be presented with featured listings before being authenticated or before registering with the connection provider. Thus, a click on a link embedded in the featured listing may not be counted as a qualified click, until a click on a link in the featured listing leads the user to successful registration or authentication in which the system verifies the payment information of the user. In one embodiment, the click on a link can be qualified within a period of time (e.g., one hour, a day, the same day, etc.) via the user supplying the payment information, or a login process to identify the payment information that has been previously submitted to the system.

In one embodiment, a qualified click eliminates repeated clicks during a period of time, clicks on different links embedded in a same featured listing, and/or repeated clicks on the same presentation of the featured listing. Thus, the qualified click represents a customer who is ready to pay for services provided by the sellers. In one embodiment, when a customer generates more than a predetermined number of qualified clicks on various listings within a predetermined time period (e.g., an hour, a day, etc.), subsequent clicks on listings by the customer within this time period will not be considered as qualified clicks.

In one embodiment, a qualified click is also limited to a new customer who did not have made a purchase from the listing before (or within a predetermined period of time). Alternatively, a qualified click may be allowed from a prior customer of the listing.

In various embodiments, the advertisement fee may be charged in response to a qualified click on a link presented on the featured listing, a connection established/initiated for real time communication, a transaction resulted from the advertisement, a lead for non-real-time communication from a potential customer, or a combination of these events. For example, when the listings featured via an audio portal, such as a telephone based directory service, a selection of a listing by a customer who is willing to provide payment information, such as a credit card number or a debit card number, can be considered as a qualified event for which an advertisement fee can be charged.

In one embodiment, the indicator of the transaction earning potential is computed from multiplying an average earning potential by the rate of converting from advertisement presentation to transaction. In one embodiment, the transaction conversion rate is based on a position normalized count of presentations. For example, a listing featured at the top position may have a higher transaction conversion rate than the same listing featured at the second position. Based on statistic data collected from the specific listing, or an average of a category of listings, or an average of listings of a variety of categories, the ratios between the transaction conversion rates for different positions can be obtained. The ratios can be used to normalize the number of presentations in which the listing is presented in various different positions. For example, the number of presentations of the listing as presented in the second position can be multiplied by the ratio between the transaction conversion rate for being presented at the top position and the conversion rate for being presented at the second position to obtain an equivalent number of the presentations of the listing at the top position, from the conversion point of view. Thus, the transaction conversion rate computed from the position normalized count of presentation represents a position normalized conversion rate; and the indicator of transaction earning potential computed from the position normalized conversion rate represents a position normalized indicator of transaction earning potential.

In one embodiment, the average earning is based on the average amount of customer spending on the specific listing, or the average amount of customer spending on all listings of a specific seller. For example, the average amount of customer spending may be the average spending on the specific listing by new customers in their first transactions, or the average spending on the specific listing by customers during a predetermined period of time from their first transactions, or the average accumulated spending on the specific listing by various customers. For example, the average amount of customer spending may be the average spending on the a group of listings of the seller, or all listings of the seller, by new customers in their first transactions, or the average spending on the group of listings or all listings of the seller by customers during a predetermined period of time from their first transactions, or the average accumulated spending on the group of listings or all listings of the seller by various customers.

In another embodiment, the value formula includes the weighted average of an indicator of the advertisement earning potential, an indicator of the earning potential from the first transaction with a new customer, and an indicator of earning potentials from subsequent repeated transactions with the new customer. Varying weights for the indicators can be used to optimize different business goals for maximizing short term revenue, mid term revenue and long term revenue In another embodiment, the value formula includes the weighted average of an indicator of the advertisement earning potential, an indicator of the earning potential from the first transaction with a new customer, and an indicator of earning potentials from subsequent repeated transactions with the new customer. Varying weights for the indicators can be used to optimize different business goals for maximizing short term revenue, mid term revenue and long term revenue.

In one embodiment, the average amount of customer spending is computed based on the transactions in listings from a same category. In one embodiment, the average amount of customer spending is based on a variety of listings within a specific time period.

In one embodiment, the seller can offer a percentage of transaction revenue generated for featuring the listing. For example, the seller may offer a percentage of the first transaction with a new customer generated from featuring the listing as the advertisement fee, or as part of the advertisement fee which also includes a fixed bid price. For example, the seller may offer a percentage of all transactions with a new customer generated from the presentation without offer a fixed bid price for the advertisement fee. Using the value formula and the average amount of customer spending, the connection provider can compute a value to rate listings based on a specific business goal.

In one embodiment, the conversion rates used in the value formula are also selected based on the characteristics of the media channels used to deliver the featured listings, the characteristics of the customers to whom the featured listings are presented.

In one embodiment, statistical data are used to determine the conversion rate and average customer spending. When there is no statistical data available to determine a conversion rate or average amount of customer spending (or when the statistical data does not have sufficient number of sample points), pre-determined default values can be used temporarily. For example, the median of the conversion rate or average amount of customer spending for a group of similar sellers can be used as the default values. When a sufficient number of sample points are available, the conversion rate and average amount of customer spending determined from the statistical data are used. During the transition to accumulate more statistical sample points, a fading function based on the number of available sample points can be used to transit from the pre-determined default values toward the statistical data based values.

For example, a weighted average of the default value of a conversion rate and a statistical data based conversion rate can be used to determine a conversion rate used in the value formula; and the weight can be a smooth function of the available sample points to transit the conversion rated used from the pre-determined default values towards the statistical data based conversion rated as the number of available sample points increases. For example, a linear fading function can be used when the number of available same points is between an upper limit and a lower limit.

For example, a weighted average of the actual conversion rate of the listing and the median of the conversion rates of listings in the same category of the listing can be used as the conversion rate in the value formula. For example, the weight for the actual conversion rate may be $W=\text{Min}(\text{Max}(0, 2 \times n-I), I)/I$, where n is a count of the presentations of the listing (presented as a featured listing) and I is a threshold; and the weight for the median of the conversion rates is $(1-W)$. Thus, when the featured impression n is below $\frac{1}{2}$, the weight W is zero and the median value is used; when n is between $\frac{1}{2}$ and I, the weight W increases linearly from 0 to 1 as n increases; when n is above I, W is one and the actual conversion rate of the listing is used.

In one embodiment, when the available sample points for computing a rate or spending average is not sufficient for a specific condition, a rate or spending average computed from sample points under a relaxed condition can be used temporarily; and a smooth transition is arranged using a fading function based on the number of available sample points. For example, when the number of sample points for the average amount of customer spending in a specific listing is low, the average amount of customer spending in listings in the same category can be used; and as the number of sample points for the average amount of customer spending in the specific listing increases, the fading function causes the smooth transition from the average amount of customer spending in listings in the same category toward the average amount of customer spending in the specific listing.

In one embodiment, the seller/advertiser can specify an advertisement fee via a maximum bid. In one embodiment, the maximum bid is independent from the revenue resulting from the transaction that is lead to by the advertisement (e.g., featured presentation of the listing), such as a specified maximum dollar amount. In another embodiment, the maximum bid is based on the revenue resulting from the transaction that is lead to by the advertisement (e.g., featured presentation of the listing), such as a specified maximum percentage of the revenue generated from the first transaction with a new customer, (or some or all of the transactions with a new customer). In one embodiment, the seller/advertiser can offer an advertisement fee based on a combination of a transaction independent bid and a transaction dependent bid.

In one embodiment, the maximum bid is used to determine a value score to rank the listing against competitors using a value formula discussed above. The actual bid is determined based on the competitor ranked immediately below this listing. For example, based on the value score of the competitor that is ranked immediately below the featured listing, the bid that is required to generate the same value score can be determined from the value formula for the featured listing.

For example, when the seller/advertiser of featured listing specifies a maximum bid for the advertisement fee that is independent on the transaction revenue, the weighted indicator of the transaction earning potential of the featured listing can be subtracted from the value score of the next competitor, ranked immediately below the featured listing, and then divided by the product of the weight of the indicator of the advertisement earning potential and a conversion rate for the chargeable advertisement event (e.g., a featured presentation of the listing, a qualified click, an initiation of a connection between the customer and the seller/advertiser for real time communications, such as telephone conversation, text, voice and/or video chat, etc.). When the computed bid that generates the same value score as the next competitor plus one increment is lower than the maximum bid, the actual bid is the computed bid plus one increment; otherwise, the actual bid is the maximum bid. An increment may be one cent, or ten cents, or other predetermined amounts.

In one embodiment, the actual bid is further required to be above a minimum bid which may be specified for a particular category of listings. When the actual bid determined based on the value score of the next competitor is lower than the minimum bid, the advertisement fee is the minimum bid. For example, when the featured listing does not have a next competitor (e.g., the featured listing has the lowest rank in the listings that meet the conditions for being featured), the advertisement fee of the featured listing is the minimum bid.

Figure 14:
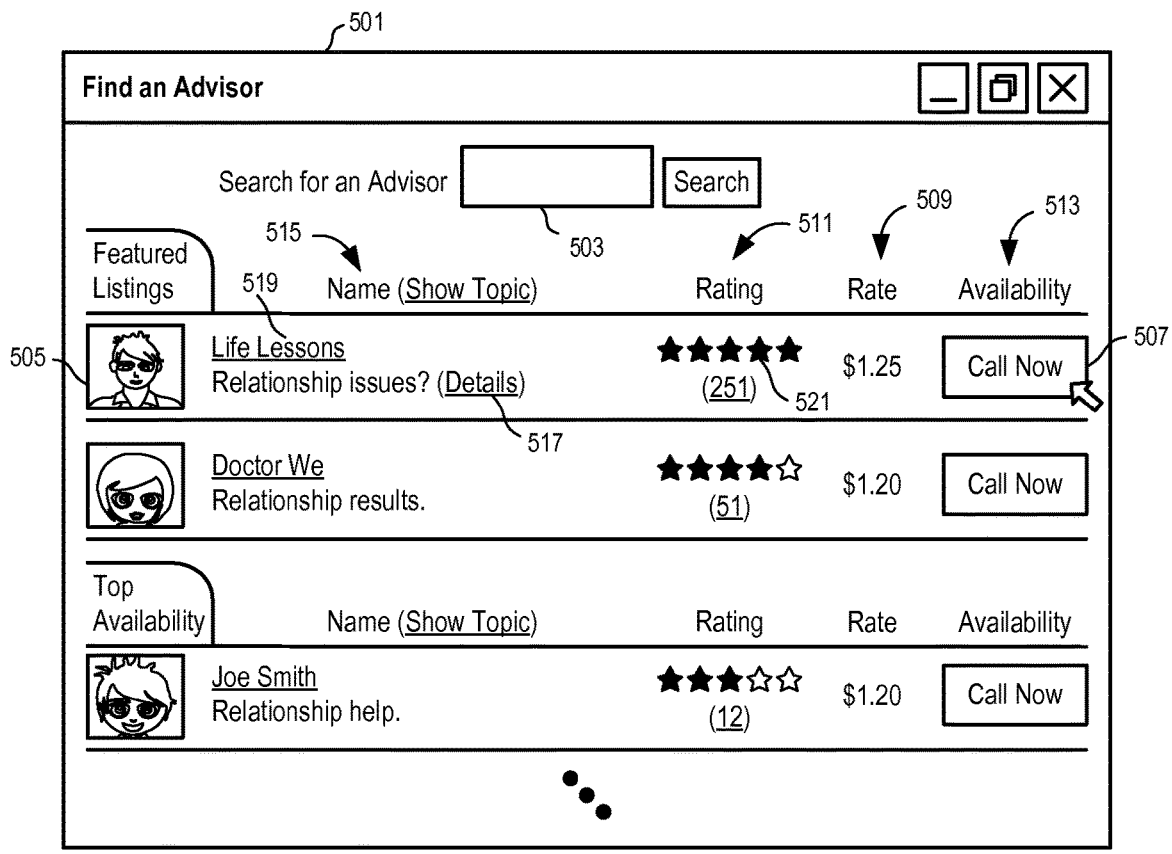
FIG. 14 illustrates a way to present featured listings according to one embodiment.

FIG. 14 illustrates a way to present featured listings according to one embodiment. In FIG. 14, a browser (501), such as a general purpose web browser or a custom application program, is used to present the listings of the advisors. The listings may be presented in response to the customer/user browsing through a hierarchical directory of categories, or a search request. For example, in FIG. 14, a keyword including one or more words can be specified in the entry box (503) to initiate a search for listings that match the keyword.

In FIG. 14, a set of featured listings are presented on top of other listings to advertise the featured listings. The sellers of the featured listings may or may not offer a separate advertisement fee for featuring the listings. A value formula is used to compute the value scores of listings that are qualified to be featured (e.g., having a user rating above 3.5 and current availability for a connection with the customer for real time communications).

For example, the value scores of the qualified listings can be evaluated to rank the candidates. A predetermined number of top ranking listings can be selected as the featured listings. The featured listings are presented according to the value scores, while the other listings may be presented according to a different order, based on the rate (509), the rating (511), availability (513), name (or topic) (515), etc. A presented listing may also include an icon/image (e.g., 505) supplied by the seller/advertiser.

In one embodiment, when the seller/advertiser is available for real time communications, an icon button (e.g., 507) is also presented for the listing. The customer/user can use a cursor to select the icon button to request a connection to the seller/advertiser for real time communications, such as a telephone conversation, a text, voice and/or video chat, and/or an application sharing session (e.g., screen sharing, common white boarding, etc.).

In one embodiment, when the seller/advertiser is not currently available for real time communications, an icon button (not shown in FIG. 14) can be displayed, which when selected, causes the browser to provide an interface for arranging an appointment for a call to the seller/advertiser.

In one embodiment, when the icon/image (505) of the seller/advertiser (or the link (517 or 519)) is selected (clicked), the browser displays detailed information about the listing. When the rating (521) is selected, selected feedbacks from prior customers of the listing is displayed. A selection of any of the links embedded in the listing can be a click, which can be qualified as a chargeable event for advertisement fee (e.g., a fee for featuring the advertisement). Example conditions for qualifying the click include the customer having provided payment information (e.g., a credit card number, a debit card number, a checking account number, a debit account number, etc.), the customer having not clicked more than a predetermined number of listings within a period of time, the customer having not made a purchase from the seller/advertiser within a period of time, the customer having not made a click on the listing within a period of time, etc. Some of the conditions may be satisfied or verified after the click; some of the conditions may be satisfied or verified before the click.

In one embodiment, a seller/advertiser may not offer an advertiser fee separate from the predetermined commission fees charged by the connection provider for transactions made via the communication connections provided by the connection provider. However, when the value score of such a listing is high enough, the connection provider may also present such a listing as a featured listing.

In one embodiment, the seller/advertiser may specify a bid price for preferential placement in featured listings. The listing management tool may display the bids of competitors to assist the seller/advertiser in determining a bid price for the advertisement fee. However, since the selection and placement of featured listings are based on the combination of the customer spending, the bid price, and the conversion rate, it is not easy for the seller/advertiser to determine a bid price based on the bid prices of the competitors.

In one embodiment, a listing management tool can determine the competitor listings that can be qualified as featured listings, determine the value scores of the competitors, and determine the actual bid that are required for the listing to have a value score ranked above the competitors. For example, the top list of value scores of the competitors can be converted into a list of actual bids for the listing to win various positions in featured listings. The actual bids can be provided to help the seller/advertiser in determining a price bid for getting the listing presented as a featured listing. In one embodiment, a seller/advertiser can place a maximum bid for a specific position in featured listings.

In one embodiment, a seller can budget advertisement spending based on revenue incomes generated. For example, the seller can allocate a percentage of the transaction revenue for preferential placement in featured listings to attract new customers (e.g., 10% of earned revenues). Thus, as the listing generates more incoming based on the connections established by the connection provider via the listings, the connection provider can automatically adjust the advertisement budget of the listing.

In one embodiment, the connection provider collects statistic data and presents the marketing acquisition costs. For example, since the advertisement fee is charged after the payment information from the customer is identified, the advertisement fee can be associated with the identity of the customer. When a call to the seller/advertiser is initiated from the customer, the connection provider may provide the seller/advertiser with the information about advertisement fees that have been paid to acquire this customer and the information about past spending of the customer on the listing. When there are more than one callers waiting in the line, the seller/advertiser may use such information to prioritize the queue of callers.

In one embodiment, the listing management tool also allows the seller to specify a budget limit for advertising to an individual customer. After a certain amount of advertisement fee has been paid to acquire the customer (e.g., $10), and/or a ratio between the accumulated advertisement fee spent on the customer and accumulated spending of the customer on the listing is above a threshold value (20%), the listing may not be presented as a featured listing to the customer.

Figure 15:
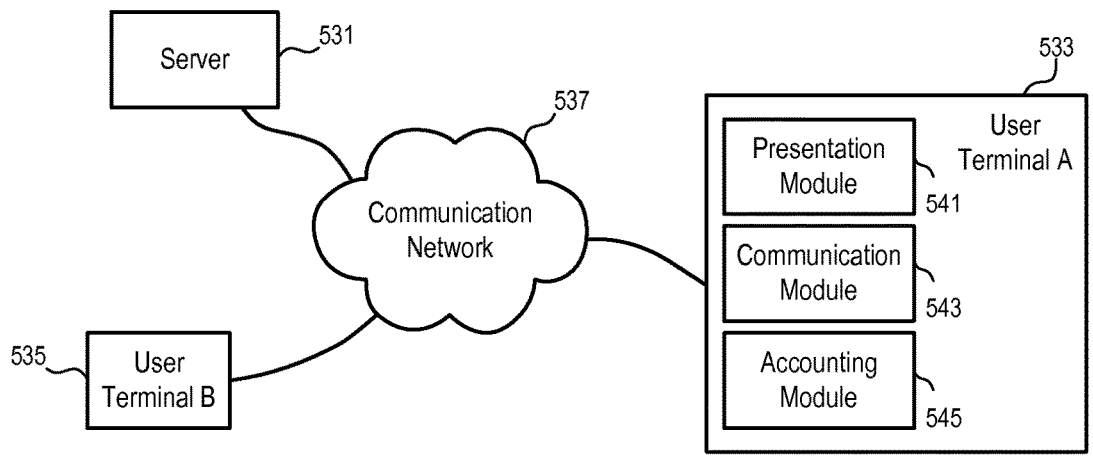
FIG. 15 shows user terminals configured to provide real time communications according to one embodiment.

FIG. 15 shows user terminals configured to provide real time communications according to one embodiment. In FIG. 15, the user terminal (533), such as a telephonic apparatus, includes a presentation module (541), a communication module (543) and an accounting module (545). However, a user terminal with more modules can be used; and a user terminal with fewer modules can also be used in at least some embodiments described below.

In one embodiment, the presentation module (541) is configured to present to a user a listing retrieved from the server (531) or from a peer to peer network over the communication network (537). In one embodiment, the listing includes a communication reference which can be selected on the user terminal (533) to request a connection to a user terminal (e.g., 535) for communications with the entity of the listing (e.g., advertiser, seller, advisor, etc.).

In one embodiment, the communication module (543) can make a peer to peer connection to the user terminal (535) via the communication reference provided in the listing. For example, the communication reference provided in the listing may include an encrypted reference to connect to the user terminal B (535), such as the user identifier of the callee, a telephone number of the callee, a session initiation protocol universal resource identifier of the callee, etc. The communication module (543) is configured to decrypt the reference and make a connection to the user terminal via a peer to peer network. For example, the communication module may query the peer to peer network or the server (531) to determine the presence of the callee on the user terminal (535) according to the decrypted user ID of the callee and then initiate a connection with the user terminal (535).

In one embodiment, the communication module (543) initiates the connection in accordance with the callable schedule of the callee. For example, the communication module (543) can be configured to query whether the current time instance is within the callable schedule of the callee; and the connection is not initiated if the current time instance is outside the callable time period of the callee. In one embodiment, the peer to peer network or the server (531) is configured to provide the presence information of the callee being on the user terminal when the current time instance is within the callable schedule of the callee. When the current time instance is outside the callable schedule, the user terminal (533) is not provided with the presence information that can be used to call for the connection, even when the callee is online on the user terminal (535).

In one embodiment, the accounting module (545) is used to maintain the subscription information and/or the usage data. For example, when the user activates the user terminal (533) for the subscription or when the user signs into the member account of the user, the subscription information and/or the usage data can be initialized or loaded into the accounting module (545). The subscription information indicates the time period in which the user subscription is valid; and the usage data may include the allowance that is available to the user and/or the usage history.

In one embodiment, when the user signs off from the user terminal (533), the account information (e.g., subscription data and/or usage data) is transferred to the server (531) which allows the user to sign in from a different user terminal to access the service provided by the subscription. In one embodiment, a user can explicitly request the user terminal to transfer the balance to the server or to another user terminal.

In one embodiment, the accounting module (545) periodically reports the account information to the server (531). In one embodiment, account information is reported with details about the calls for connections (e.g., call detail records).

In one embodiment, when a user requests for a listing, the peer to peer network or the server (531) can determine whether the user terminal used by the user is capable of making a peer to peer connection and tracking the account information. When the user terminal has the capability, the user terminal is provided with the listing embedded with a version of the communication reference of the callee; and the listing is selectable to initiate the peer to peer connection without going through the server (531). When the user terminal does not have the capability, the user terminal is provided with the listing embedded with a communication reference of the server (531) to allow the user terminal to request the server (531) to provide a connection with the callee. When the user terminal (533) does not have the communication module to make the real time communication connection, the user terminal (533) can be presented with a reference of the server (531) for a call for connection via a separate user terminal, or a reference to request a callback from the server (531).

In one embodiment, when the communication module (543) fails to make a peer to peer connection with the user terminal of the callee (e.g., when the peer to peer network determines that the callee is not currently on line), the communication module (543) is configured to request the server (531) to provide a connection with the callee. For example, when the softphone of the customer failed to connected to the softphone of the advisor, the softphone of the customer may call the server (531) which may determine a landline phone of the advisor and connect the customer to the advisor on the landline phone.

Thus, depending on the capabilities of the user terminals of the user and the callee, the server (531) may dynamically get involved in the connection process and/or in the process of tracking the subscription privilege, usage of the subscription privilege, and/or account balances. The user and the callee of the listing can use a variety of user terminals to access and deliver the services, such as user terminals that are implemented with only a subset of functionalities of the modules of user terminal (533), or conventional user terminals.

In one embodiment, when a user terminal of the caller (or the callee) partially or entirely lacks the functionalities to make the peer to peer connection and/or track the usage according to the subscription, the communication references presented in the listings are dynamically adjusted according to the capability of the user terminal to bring the server (531) (or a peer to peer network) into the communication path to add the functionality as a system. For example, a server (531) may act as a portion of the communication module of the user terminal and/or as a portion of the accounting module of the user terminal. For example, the user terminal of the caller can communicate with the server (531) to establish a connection with the user terminal of the callee; and the server (531) can initiate a session for the connection with the user terminal of the callee and provide a virtual accounting module for the user terminal (533) in the session, after authenticating the caller. For example, a caller can use a plain old telephone set (POTS) to call the server (531), which connects the caller to an IVR system (or a human operator) to authenticate the caller, verify the subscription privilege of the caller, track the usage of the caller, and make a peer to peer connection to the user terminal of the callee (or call the callee on a PSTN network).

In one embodiment, at the time the listing is being requested for presentation to the user, the server (531) or the peer to peer network can provide the communication reference based on a determination of whether the user terminal of the user and the user terminal of the callee can make a peer to peer connection and track the subscription usage.

For example, if both the user terminal of the user and the user terminal of the callee have the peer to peer communication module and the accounting module, the user terminal can be provided with the communication reference of the callee for a peer to peer connection without going through a centralized server. The accounting module of the user can deduct an amount of balance from the account of the user maintained on the user terminal of the user; and the accounting module of the callee can add an amount of balance to the account of the callee maintained on the user terminal of the callee.

For example, if both the user terminal of the user and the user terminal of the callee have the communication module to make a peer to peer connection but one of the user terminals lacks the accounting module, the communication reference can be assigned to cause the accounting module to report the activity to the server (531). Thus, the system can operate in a way as if the missing account module were on the server (531).

For example, when the user terminal of the user has an accounting module (545) and the user terminal of the callee does not have an accounting module, the accounting module (545) can cause the communication module (543) to report the communication session to the server which credits to the account of the callee based on the communication duration over the peer to peer connection between the callee and the user as reported by the user terminal (533) of the user.

For example, when the user terminal of the user does not have an accounting module and the user terminal of the callee has an accounting module, the user terminal of the callee can communicate with the server (531) to verify the subscription of the user, to track the usage of the subscription of the user, and/or to reduce the balance of the account of the user, based on the communication duration over the peer to peer connection between the callee and the user as reported by the user terminal (535) of the callee.

For example, when neither the user terminal of the user nor the user terminal of the callee has an accounting module, the user terminal of the callee can be provided with a VoIP communication reference which, when used to set up a call, causes the call signaling messages to go through the server (531) to allow the server to check the subscription for the connection, to provide the connection based on the callable schedule of the callee, and/or to track the usage and service the accounts of the user and the callee. For example, the communication reference can be provided with an embedded identifier of the caller after the caller is authenticated. Alternative or in combination, the caller can be authenticated after the caller initiates the call.

In one embodiment, a communication tool is provided to connect customers to entities such as sellers, advisors, service providers, etc. A system is configured to monitor the time period of real time communications transmitted over the connection established via the communication tool. The entities may use blogs, web sites, business cards, newspaper, billboards, etc., to reach their customers. The listings of the entities can also be optionally advertised by the provider of the communication tool to bring new customers to the entities.

In one embodiment, the price for the service provided via the communication tool is separate from a price for leads to customers. Thus, a low base price can be set for the communication tool; therefore, the entities who bring their own customers are not charged too much. The presentations of the listings of the entities to generate leads to new customer are prioritized based on the bid prices specified by the entities; and the leads to new customers generated by the marketing effort of the tool provider are charged for according to the bid prices. Thus, the entities for whom the leads to the customers are generated by the provider of the communication tool are charged what the market will bear.

For example, the connection provider can provide the communication tools to facilitate commerce over the communication connections established via the communication tools, at a low base price for entities who bring their own customers and at prices that are determined by the market for entities for who the connection provider brings customers In one embodiment, advisors are provided with the communication tools to deliver services and get paid. For example, the communication tool may be a call button configured to request a connection server to callback to the customer for a telephonic connection to the advisor, or an assigned phone number of a connection server to request for a further connection to the advisor. The connection provider uses the communication tools to establish the communication connections between the advisors and their customers and to charge the customers on behalf of the advisors. For these services provided via the communication tools the connection provider charges the advisors a base price (e.g., 20% of what the advisors charge their customers, a fixed rate per minute, etc.), regardless who brings the customers to the advisors. Thus, a low base price can be used, since the advisors may use their own media channels, such as blogs, to get their customers.

Since a lead to a customer is also valuable, the connection provider allows the advisors to bid for leads to customers. The connection provider can use a web portal, a voice portal, a directory assistance service, a directory listing service, a list of featured listings, a search engine, and/or other advertisement channels to reach potential customers. Through the use of the auction process for leads to customers, the leads are charged based on what the market will bear. The presentation of the listings of the advisors can be prioritized based as least in part on the bid prices of the competitors of an advisor. When a new lead to a customer is delivered to the advisor, the advisor is charged a fee based on the price bid. The price bid can be specified as an additional percentage of what the advisor charges the customer in the first call or what the advisor charges the customer within a period of time (e.g., a day or a week), or a lump sum regardless what the advisor charges the new customer. A new lead to a customer may be identified based on a characteristic of a call (e.g., the telephone number of the customer determined via an ANI service), a characteristic of a selection of a link (e.g., the IP address of the computer of the customer which is used to make the selection), user identifications of registered users, email addresses of the customer, etc.

In one embodiment, an optional time window can be used to count revisits of a same customer as one lead, if the advisor is charged a lump sum per lead. In another embodiment, an optional time window can be used to count revisits of a same customer as one call, if the advisor is charged for a lead based on what the advisor charges the customer in that call.

In one embodiment, a connection provider can use the referral page of the call buttons to determine who brings the customer to the advisor. If the referral page of the call button is a directory of listings, an advertisement, a featured presentation of listings, etc., which has a presentation of the listing of the advisor presented by the connection provider on behalf of the advisor, the advisor is charged a fee for a lead to the customer based on the bid price of the advisor; otherwise, the advisor is charged at a base price without the fee for the lead to the customer.

Figure 16:
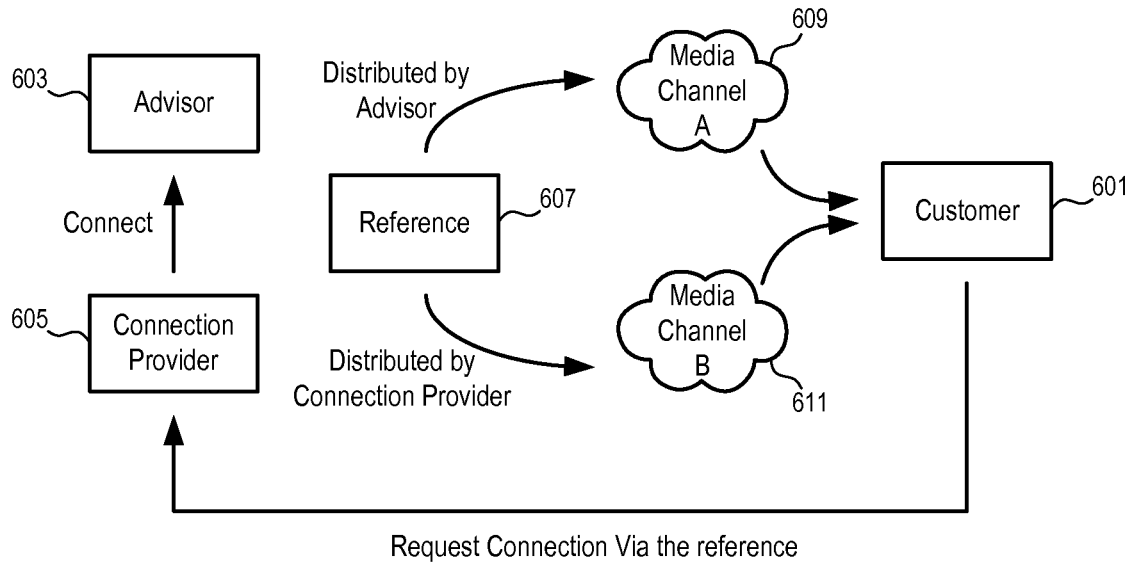
FIG. 16 illustrates a system to provide a communication connection via an optionally advertised communication reference according to one embodiment.

FIG. 16 illustrates a system to provide a communication connection via an optionally advertised communication reference according to one embodiment. In FIG. 16, the advisor (603) is provided with a reference (607) as a communication tool to service customers. The advisor (603) may distribute the reference (607) to potential customers via a media channel (609), such as blog, email, web site, advertisements on web sites or search engines. Optionally, the advisor (603) can also request the connection provider (605) to market the service of the advisor (603) via a media channel (611).

In FIG. 16, the reference (607) can be used by the customer (601) to request a connection to the advisor (603) via the connection provider (605) for real time communications. The advisor (603) can provide his/her service over the connection for real time communications to the customer (601); and the connection provider monitors the connection to charge the customer on behalf of the advisor (603

In one embodiment, the reference (607) is provided in a way such that when the reference (607) is used to request the connection to the advisor, the environment in which the reference is embedded can be identified.

For example, the reference (607) may include a link embedded in the document. When the link is selected to request for the connection, the address of the document hosting the link is also send to the connection provider (605) (e.g., as a referral URL of the web request associated with the selection of the link).

Based on the identification information of the environment (e.g., the address of the host web page of the link), the connection provider can determine whether or not the request is a result of the marketing effort by the connection provider. When the request is a result of the marketing effort by the connection provider, the advisor is charged a fee for the lead to the customer in addition to a fee based on the base price. When the request is not a result of the marketing effort by the connection provider, the advisor is charged according to the based price without a fee for the lead to the customer.

In another embodiment, the connection provider (605) identifies the customer (601) before presenting the reference (607) to the customer (601) via the media channel (611). After the customer (601) requests the connection via the reference (607), the connection provider (605) can identify the customer before connecting the customer (601) to the advisor (603). Through correlating the connection requested by the customer via the reference (607) with the presentation of the reference (607) to the customer that is presented within a predetermined time period (e.g., five minutes, one hour, a day, etc) from the connection request, the connection provider (605) can determine that the marketing effort by the connection provider contributed to the lead to the customer (601). If there are one or more presentations of the reference (611) presented by the connection provider on behalf of the advisor (603) to the customer (601) within the predetermined time period from the customer's request for the connection, the connection request can be considered as a result of the presentation by the connection provider, for which the advisor can be charged a fee for the lead to the customer.

In one embodiment, the connection provider uses the Internet address of the customer to identify the customer. Alternatively, the connection provider can identify the customer via an authentication process. For example, the customer may be required to sign in to a web site using a member ID and password before being able to request the information containing the reference (607); and the customer can be authenticated using the member ID and the password before the request for connection is processed to provide a connection to the advisor. Through correlating the activities associated with the customer identified via the member ID and password, the connection provider can determined whether the advisor is to be charged for the lead to the customer.

Although FIG. 16 illustrates an embodiment in which the connection is provided via a centralized connection provider, at least part of the functionality of the connection provider can be implemented in the user terminals used by the customer (601) and/or the advisor (603). Thus, the customer (601) and the advisor (603) can establish a peer to peer connection using the reference (607) without having to go through a centralized connection server. Further, the user terminal can be configured to charge the customer (601) and/or the advisor (603) for the connection provider (605).

In FIG. 16, the same reference is distributed by the advisor and by the connection provider. Alternatively, different references can be distributed such that whether the customer is requesting a connection via the marketing effort of the connection provider can be determined based on the reference used by the customer.

In one embodiment, a connection provider can provide one communication reference for distribution by the advisor (e.g., via the blog of the advisor) and a separate communication reference for distribution by the connection provider (e.g., via the web directory of the connection provider). Both communication references can be used by a customer to reach the connection provider. The advisor is charged according to the base price without the fee for the lead to the customer when the customer is connected to the advisor via the communication reference distributed by the advisor. The advisor is charged according to the base price and the advisor's bid price for the lead to the customer when the customer is connected to the advisor via the separate communication reference distributed by the connection provider.

Figure 17:
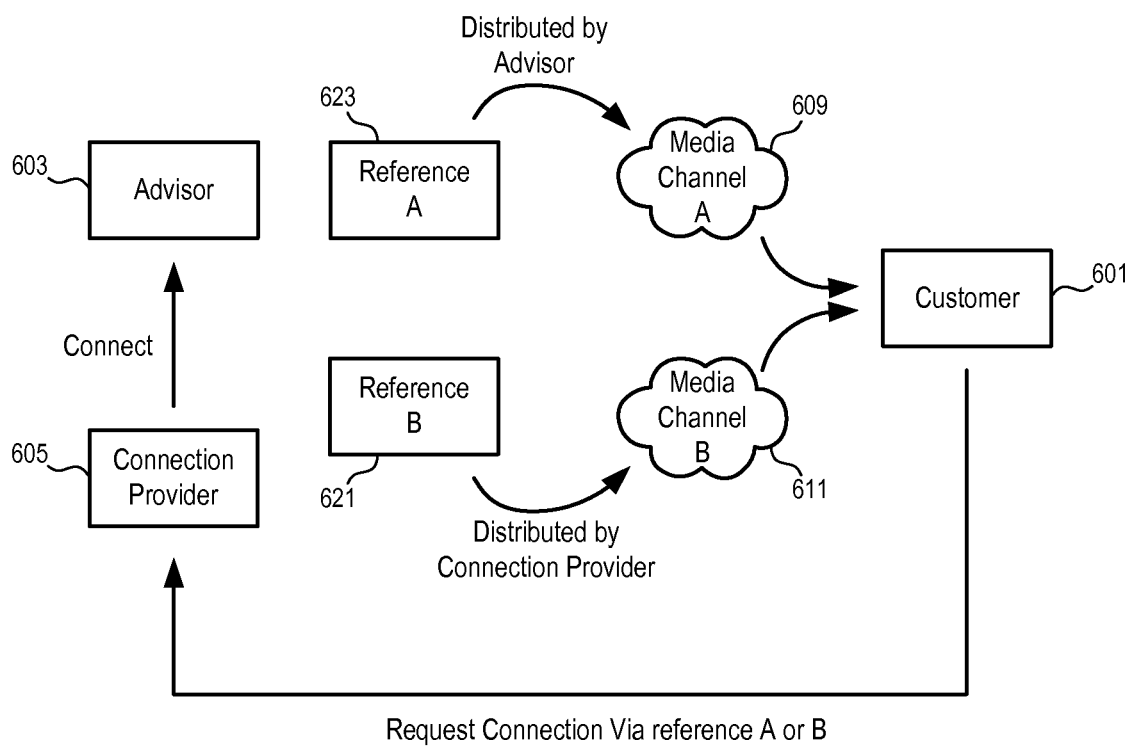
FIG. 17 illustrates a system to provide a communication connection via separate communication references according to one embodiment.

For example, FIG. 17 illustrates a system to provide a communication connection via separate communication references according to one embodiment. In FIG. 17, the connection provider (605) provides one reference (623) to the advisor (603); and the reference (623) can be distributed to the customers through the marketing effort of the advisor (603). For example, the advisor (603) may distribute the reference (623) using various channels, such as the blog of the advisor, emails, banner advertisements on other web sites, advertisements placed through a search engine, advertisements in newspapers, brochures, business cards, or bill boards, etc.

In FIG. 17, the advisor (603) can also request the connection provider (605) to market the service of the advisor (603). The advisor (603) can optionally specify a bid price for a lead to a customer. The connection provider (605) can prioritize the marketing effort based at least in part on the bid price. To facilitate the identification of whether a customer is requesting the connection via the marketing effort of the connection provider (605), a separate reference (621) is distributed via a media channel (611). Both the reference (623) and the reference (621) can be used to request the connection to the advisor (603) for the same service of the advisor (603). The difference in the reference (623) and the reference (621) allows the connection provider to determine whether the lead to the customer is a result of the marketing effort of the connection provider (605).

In FIGS. 16 and 17, the advisor (603) and the connection provider (605) present the references to the customers via different medial channels (609 and 611). For example, the connection provider distributes the reference via a media channel under the control of, or operated by, the connection provider, such as a directory service, a search engine, a voice portal, etc., while the advisor distributes the reference via other medial channels that are not under the control of, or operated by, the connection provider. However, the advisor (603) and the connection provider (605) do not have to market the service of the advisor (603) via separate medial channels. In some embodiments, the advisor (603) and the connection provider (605) can present the references to the customers via a same medial channel which is not operated by the connection provider (605).

In one embodiment, a connection provider uses an IVR system to prompt the customer to identify what led the customer to the advisor. For example, the communication tool may include a toll free number (e.g., 1-800-MyEther) with an extension assigned to the advisor. The connection provider presents the service of the advisor via a featured listing. After the customer dials 1-800-MyEther, the customer is greeted with a prompt message of "please press 1 for an advisor from featured listings, or press 2 for your favorite advisors", before the customer is prompted to dial the extension number assigned to the advisor. Thus, based on the selection/input received from the customer, the connection provider can determine whether or not the call from the customer is a result of a presentation of a featured listing.

Figure 18:
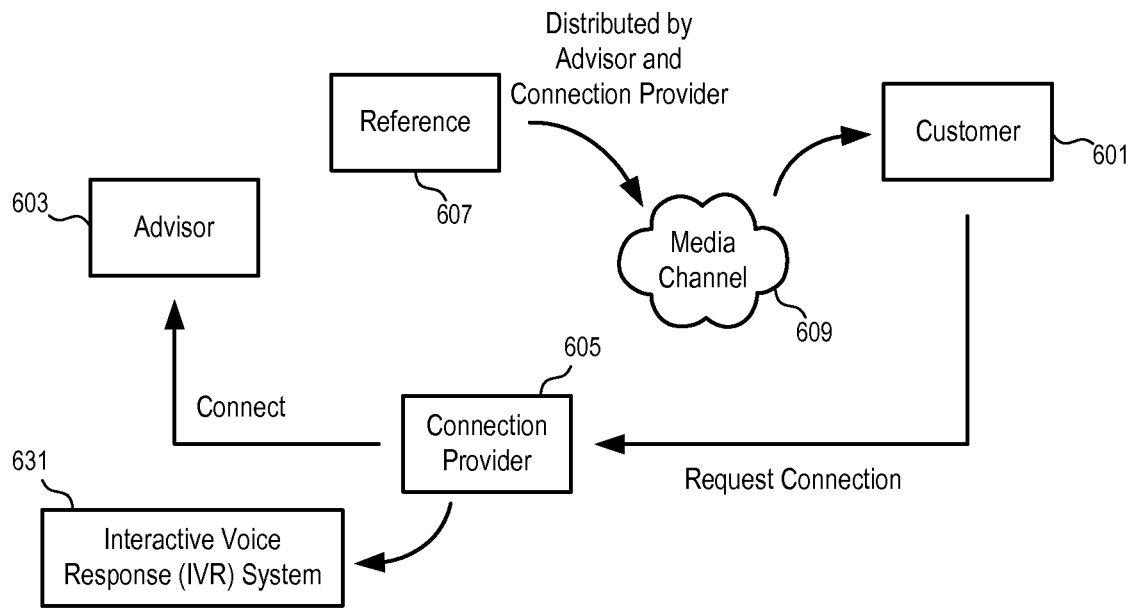
FIG. 18 illustrates a system to provide a communication connection via an optionally advertised communication reference and an Interactive Voice Response (IVR) system according to one embodiment.

For example, FIG. 18 illustrates a system to provide a communication connection via an optionally advertised communication reference and an Interactive Voice Response (IVR) system according to one embodiment. In FIG. 18, the same communication reference (607) is distributed by both the advisor (603) and the connection provider (605). The connection provider (605) may generate a lead to the customer via a link to the web site (e.g., blog) of the advisor, via a message forwarded to the advisor, via a featured listing, etc.

In FIG. 18, after the customer (601) is connected to the connection provider (605), the customer (601) is connected to an interactive voice response (IVR) system (or a human operator) to identify whether the connection provider generated the lead to the customer (601), before or after the customer is connected to the advisor (603).

FIG. 18 illustrates a system to use a voice interface to identify whether the connection provider generated the lead to the customer (601). In some alternative embodiments, a visual interface can be used to identify whether the connection provider generated the lead to the customer (601). For example, when the user terminals are configured to make peer to peer connections between the customer (601) and the advisor (603), the user terminal of the customer can be configured to prompt the customer to specify whether the connection provider contributed to the lead to the customer (601). Thus, it is not necessary to have a centralized connection provider/IVR system to prompt the customer to specify how the lead to the customer is generated.

In one embodiment, the connection provider can monitor the timing of the presentation of the listings, the selection of the links presented in the listings, or the forwarding of the messages from the customers, etc. and the timing of the request for connection from the same customer. When the time difference between these activities is within a threshold, it can be concluded that the connection provider contributed to the lead to the customer.

Figure 19:
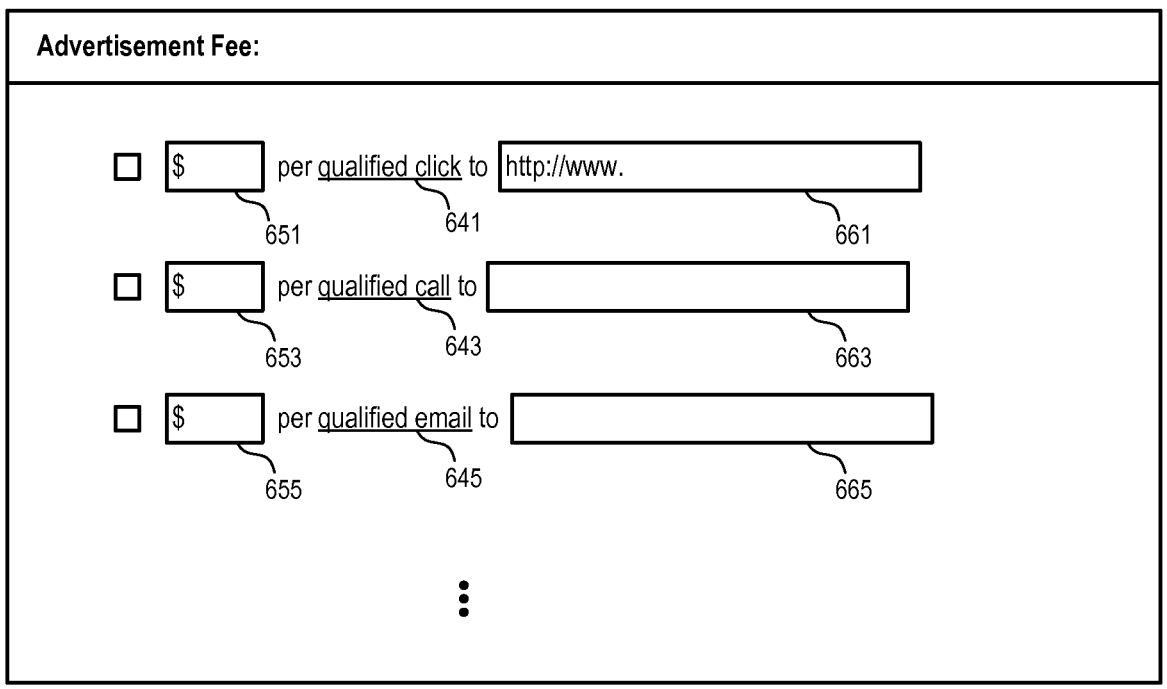
FIG. 19 shows a user interface configured to receive price bids for leads to customers according to one embodiment.

FIG. 19 shows a user interface configured to receive price bids for leads to customers according to one embodiment. In FIG. 19, the advertiser can offer different advertisement fees for different types of leads to customers generated by the advertisement. For example, the advertiser can specify a price (651) for a qualified click leading to the web page specified in the entry box (661), a different price (653) for a qualified call from a customer connected to one or more telephonic references specified in the entry box (663), a different price (655) for a qualified email from a customer forwarded to an address specified in the entry box (665).

In one embodiment, the advertiser can select the links (641, 643, and 645) to further specify conditions on the qualified click, qualified call, and qualified email. For example, the advertiser may specify a threshold time period within which repeated visits by a same customer to the web site specified by the address (661) are counted as one qualified click. For example, the advertiser may specify a threshold time period within which repeated calls by a same customer to the telephone references (661) are counted as one qualified call. For example, the advertiser may specify a threshold time period within which repeated emails by a same customer to the address (661) are counted as one qualified email. For example, the advertiser may specify a time window with which a qualified call disqualifies clicks and/or emails. In one embodiment, some of the conditions are specified by the system and some of the conditions by the advertiser.

In one embodiment, the leads to the customers are charged even if the customer does not request a connection to the advisor. Alternatively, a lead to the customer is charged only if the same customer is connected to the advisor for the service of the advisor.

In one embodiment, the system dynamically customizes the listing to promote responses in clicks, calls, emails, etc., based on the advertisement fee specified by the advertiser and the conditions for the qualified clicks, qualified calls, and qualified emails, etc. Based on the characteristics of the request for the listing, the advertisement can be customized to increase the value of the presentation of the advertisement.

Figure 20:
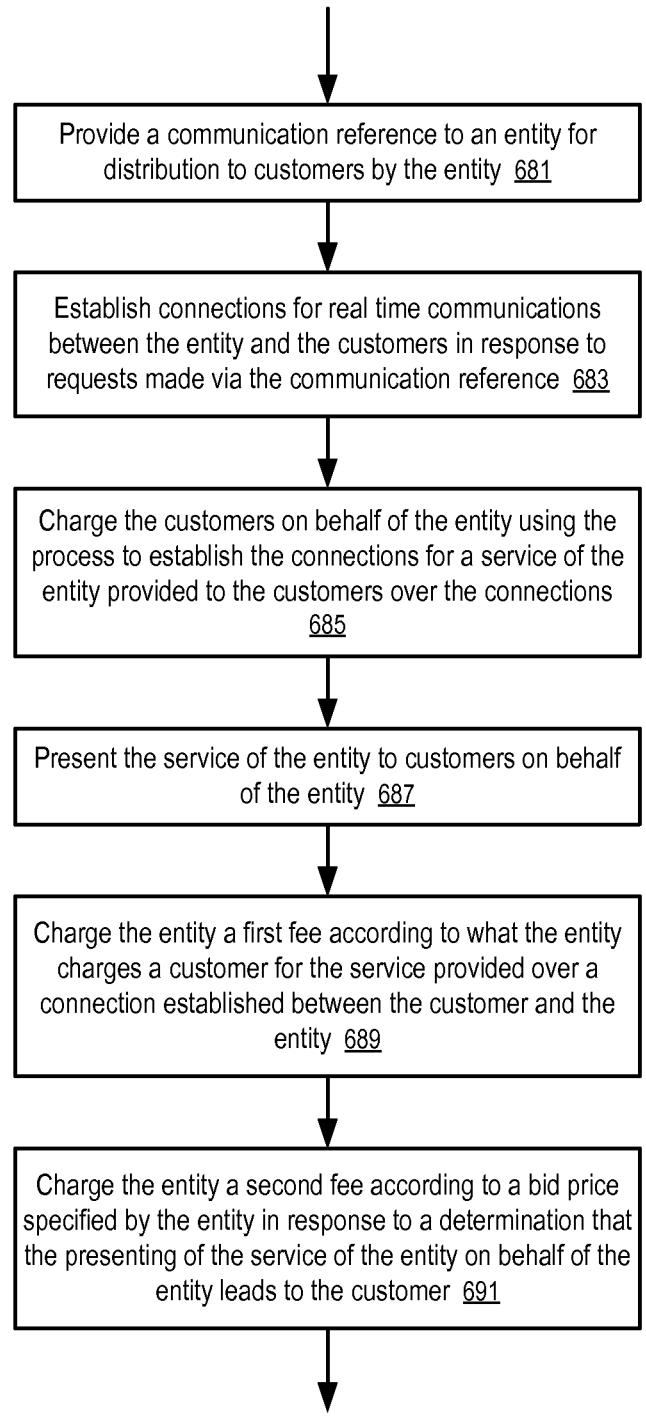
FIG. 20 shows a method to provide a communication connection according to one embodiment.

FIG. 20 shows a method to provide a communication connection according to one embodiment. In FIG. 20, a communication reference is provided (681) to an entity for distribution to customers. Connections for real time communications between the entity and the customers are established (683) in response to requests made via the communication reference. Using a process to establish the connections, the customers are charged (685) on behalf of the entity for a service of the entity provided to the customers over the connections. The service of the entity is presented (687) to customers on behalf of the entity. The entity is charged (689) a first fee according to what the entity charges a customer for the service provided over a connection established between the customer and the entity. In one embodiment, the first fee is a predetermined percent of what the entity charges the customer for the service of the entity. In another embodiment, the first fee is based on a time duration of real time communications over the connection between the entity and the customer.

In FIG. 20, the entity is charged (691) a second fee according to a bid price specified by the entity in response to a determination that the presenting of the service of the entity on behalf of the entity leads to the customer. In one embodiment, the second fee is determined based on the bid price specified by the entity and a bid price of a competitor of the entity. In one embodiment, both the first fee and the second fee are based on a time duration of real time communications over the connection between the entity and the customer.

In one embodiment, the communication reference includes a telephonic reference; and the method further includes monitoring the connection to determine the duration of a telephonic conversation related to the service to charge the customer on behalf of the entity.

In one embodiment, the communication reference includes a link selectable to request a connection server to call back the customer for the connection between the customer and the entity. Responsive to the link being selected, it is determined whether the link is embedded in a presentation of the service of the entity provided on behalf of the entity to determine whether to charge the entity the second fee.

In one embodiment, a separate communication reference is provided in a presentation of the service of the entity provided on behalf of the entity, such as a telephone number of a connection server without an extension, a telephone number of a connection server with an extension, a session initiation protocol (SIP) uniform resource identifier (URI), a Voice over Internet Protocol (VoIP) user identifier, or a user identifier in an instant messaging network. Whether to charge the entity the second fee is determined based on whether the customer is connected to the entity via the separate communication reference.

In one embodiment, a first connection with the customer is established via the communication reference; a second connection is established with the entity; and the first and second connections are bridged to connect the customer and the entity for real time communications.

In one embodiment, the customer is prompted over the first connection to receive an input from the customer; and whether the presenting of the service of the entity leads to the customer is determined based on the input from the customer.

In one embodiment, the customer is prompted over the first connection to receive an identifier assigned to the entity; and a communication reference of the entity is determined based on the identifier to establish the second connection.

In one embodiment, an identifier of the customer is determined and used to determine whether the customer is a new customer led to the entity within a predetermined period of time via the presenting of the service of the entity. The identifier of the customer may be a telephone number of the customer, an email address of the customer, an Internet address of the customer, or a member account of the customer.

In one embodiment, responsive to a request for information from the customer, selecting a listing of the entity, based at least in part on the bid price specified by the entity, for the presenting of the service of the entity to the customer. In one embodiment, the selecting of the listing is further based on a rating determined based on feedback from prior customers of the entity.

In one embodiment, responsive to a request for information from the customer, sorting a plurality of listings, including a listing of entity, based at least in part on bid prices of the listings for presentation to the customer.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

That which is claimed:
1. A method comprising:
   generating, via a server system, a first version of a first advertisement associated with a detected geographical area corresponding to a detected location of a customer of an end-user device, the first advertisement comprising visible content of a first listing that is associated with a first entity;

retrieving from a data store, of the server system, listing information associated with the first entity and including the listing information in the first version of the first advertisement;

transmitting, via the server system over a communication network, to the end-user device of the customer, a plurality of advertisements that corresponds to a plurality of listings, each listing of the plurality of listings being associated with a respective entity of a plurality of entities, and corresponding communication references, wherein the plurality of advertisements comprises the visible content of the first version of the first advertisement, which is provided to a user interface of a display device of the end-user device of the customer;

receiving a transmission, via the server system over the communication network, the transmission indicative of a request for information from the customer, and, responsive to the request, retrieving preference information associated with the customer stored in the data store of the server system;

sorting, via the server system, the plurality of listings into a sort order based on a respective value of each listing of the plurality of listings, the respective value of each listing of the plurality of listings is utilized to rate the respective listing at least partially based on the preference information associated with the customer;

receiving, via the server system over the communication network, an indication of a selection, via the user interface, by the customer of one listing of the plurality of listings in the sort order in response to transmitting a representation of the plurality of listings in the sort order to the end-user device of the customer;

establishing a real-time communication connection by routing, via the server system over the communication network, in part by at least one voice over Internet protocol using a Session Initiation Protocol connection, a telephone call between the end-user device of the customer and an end-user device of an entity of the plurality of entities associated with the one listing, of the plurality of listings, in response to detecting a selection, via the user interface, of a respective communication reference, of the communication references, associated with the one listing from the visible content of the first advertisement displayed via the display device of the end-user device of the customer; and tracking, via the server system, leads to the entity, in response to updating an attribute stored via the server system based at least in part on the real-time communication connection between the end-user device associated with the customer and the end-user device associated with the entity, and comparing the attribute to a threshold specified for the entity.

2. The method of method of claim 1, further comprising:
charging, via the server system, a first account maintained by the server system and associated with the customer on behalf of the entity of the plurality of entities associated with the one listing of the plurality of listings for establishing the real-time communication connection; and transmitting content to facilitate presentation, to the user interface of the display device, via the communication network, of a service of the entity of the plurality of entities associated with the one listing of the plurality of listings to the customer via the real-time communication connection.

3. The method of claim 2, further comprising:
charging, via the server system, a second account maintained by the server system and associated with the entity of the plurality of entities associated with the one listing of the plurality of listings a first fee according to what the entity charges the customer for the service; and charging, via the server system, the second account associated with the entity of the plurality of entities associated with the one listing of the plurality of listings a second fee according to a bid price specified by the entity for establishing the real-time communication connection.

4. The method of claim 3, wherein the first fee is a predetermined percent of fees the entity of the plurality of entities associated with the one listing of the plurality of listings charges the customer for the service.

5. The method of claim 3, wherein the first fee is based on a time duration of real-time communications over the real-time communication connection between the entity of the plurality of entities associated with the one listing of the plurality of listings and the customer.

6. The method of claim 4, further comprising:
determining, via the server system, the second fee based on the bid price specified by the entity of the plurality of entities associated with the one listing of the plurality of listings and a bid price of a competitor of the entity.

7. The method of claim 4, wherein both the first fee and the second fee are based on a time duration of real-time communications over the real-time communication connection between the entity of the plurality of entities associated with the one listing of the plurality of listings and the customer.

8. The method of claim 2, further comprising:
monitoring, via the server system, the real-time communication connection to determine a duration of a telephonic conversation related to the service to charge the customer on behalf of the entity of the plurality of entities associated with the one listing of the plurality of listings.

9. The method of claim 3, wherein the communication reference comprises a link selectable to request a connection server to call back the customer for the real-time communication connection between the customer and the entity of the plurality of entities associated with the one listing of the plurality of listings.

10. The method of claim 9, further comprising:
responsive to the link being selected, determining, via the server system, whether the link is embedded in a presentation of the service of the respective entity of the plurality of entities associated with the one listing of the plurality of listings provided on behalf of the entity to determine whether to charge the entity the second fee.

11. The method of claim 2, further comprising:
providing, via the communication network, a separate communication reference in a presentation of the service of the entity of the plurality of entities associated with the one listing of the plurality of listings; and determining, via the server system, whether to charge the entity of the plurality of entities associated with the one listing of the plurality of listings the second fee based on whether the customer is connected to the entity using the separate communication reference.

12. The method of claim 11, wherein the separate communication reference comprises one of a telephone number of a connection server without an extension, a telephone number of a connection server with an extension, a session initiation protocol uniform resource identifier, a voice over Internet protocol user identifier, and a user identifier in an instant messaging network.

13. The method of claim 1, further comprising:
establishing, via the communication network, a first connection with the customer via the communication reference;
establishing, via the communication network, a second connection with the entity of the plurality of entities associated with the one listing of the plurality of listings; and
bridging, via the server system, the first and second connections to connect the customer and the respective entity for real-time communications.

14. The method of claim 13, further comprising:
prompting the customer over the first connection to receive an input from the customer; and
determining, via the server system, establishing of the first connection based on the input from the customer.

15. The method of claim 14, further comprising:
prompting the customer over the first connection to receive an identifier assigned to the entity of the plurality of entities associated with the one listing of the plurality of listings; and
determining, via the server system, a communication reference of the entity based on the identifier to establish the second connection.

16. The method of claim 2, further comprising:
determining, via the server system, an identifier of the customer; and
determining, via the server system, based on the identifier of the customer, whether the customer is a new customer led to the entity of the plurality of entities associated with the one listing of the plurality of listings within a predetermined period of time via the presenting of the service of the entity.

17. The method of claim 16, wherein the identifier of the customer comprises one of a telephone number of the customer, an email address of the customer, an Internet address of the customer, and a member account of the customer.

18. A non-transitory computer-readable storage medium storing computer-readable instructions, which when executed, cause a server system to:
generate a first version of a first advertisement associated with a detected geographical area corresponding to a detected location of a customer of an end-user device, the first advertisement comprising visible content of a first listing that is associated with a first entity;
retrieve from a data store of the server system, listing information associated with the first entity and including the listing information in the first version of the first advertisement;
transmit, via a communication network, to the end-user device of the customer, a plurality of advertisements that corresponds to a plurality of listings, each listing of the plurality of listings being associated with a respective entity of a plurality of entities, and corresponding communication references, wherein the plurality of advertisements comprises the visible content of the first version of the first advertisement, which is provided to a user interface of a display device of the end-user device of the customer;
receive a transmission, over the communication network, the transmission indicative of a request for information from the customer, and, responsive to the request, retrieve preference information associated with the customer stored in the data store of the server system;
sort the plurality of listings into a sort order based on a respective value of each listing of the plurality of listings, the respective value of each listing of the plurality of listings is utilized to rate the respective listing at least partially based on the preference information associated with the customer;
receive, via the communication network, an indication of a selection, via the user interface, by the customer of one listing of the plurality of listings in the sort order in response to transmitting a representation of the plurality of listings in the sort order to the end-user device of the customer;
establish a real-time communication connection by routing, over the communication network, in part by at least one voice over Internet protocol using a Session Initiation Protocol connection, a telephone call between the end-user device of the customer and an end-user device of an entity of the plurality of entities associated with the respective listing, of the plurality of listings, in response to detecting a selection, via the user interface, of a respective communication reference of the communication references, associated with the one listing from the visible content of the first advertisement displayed via the display device of the end-user device of the customer; and
track leads to the respective entity, in response to updating an attribute stored by the server system based at least in part on the real-time communication connection between the end-user device associated with the customer and the end-user device associated with the entity, and comparing the attribute to a threshold specified for the entity.

19. The non-transitory computer-readable storage medium of claim 18, wherein execution of the computer-readable instructions by the server system further causes the server system to:
charge a first account maintained by the server system and associated with the customer on behalf of the entity of the plurality of entities associated with the one listing of the plurality of listings for establishing the real-time communication connection; and
transmit content to facilitate presentation, to the user interface of the display device, via the communication network, of a service of the entity of the plurality of entities associated with the one listing of the plurality of listings to the customer via the real-time communication connection.

20. The non-transitory computer-readable storage medium of claim 19, wherein execution of the computer-readable instructions by the server system further causes the server system to:
charge a second account maintained by the server system and associated with the entity of the plurality of entities associated with the one listing of the plurality of listings a first fee according to fees the entity charges the customer for the service; and
charge the second account associated with the entity of the plurality of entities associated with the one listing of the plurality of listings a second fee according to a bid price specified by the entity for establishing the real-time communication connection.

21. A server system comprising:
one or more servers coupled to one or more network interfaces to facilitate access to a communication network, and one or more storage media to retain instructions, the server system to execute the instructions to:

generate a first version of a first advertisement associated with a detected geographical area corresponding to a detected location of a customer of an end-user device, the first advertisement comprising visible content of a first listing that is associated with a first entity;

retrieve from a data store of the server system listing information associated with the first entity and including the listing information in the first version of the first advertisement;

transmit, via a communication network, to the end-user device of the customer a plurality of advertisements that corresponds to a plurality of listings, each listing of the plurality of listings being associated with a respective entity of a plurality of entities, and corresponding communication references, wherein the plurality of advertisements comprises the visible content of the first version of the first advertisement, which is provided to a user interface of a display device of the end-user device of the customer;

receive a transmission, via the communication network, the transmission indicative of a request for information from the customer, and, responsive to the request, retrieving preference information associated with the customer stored in the data store of the server system;

sort the plurality of listings into a sort order based on a respective value of each listing of the plurality of listings, the respective value of each listing of the plurality of listings is utilized to rate the respective listing at least partially based on the preference information associated with the customer;

receive, via the communication network, an indication of a selection, via the user interface, by the customer of one listing of the plurality of listings in the sort order in response to transmitting a representation of the plurality of listings in the sort order to the end-user device of the customer;

establish a real-time communication connection by routing, over the communication network, in part by at least one voice over Internet protocol using a Session Initiation Protocol connection, a telephone call between the end-user device of the customer and an end-user device of an entity of the plurality of entities associated with the respective listing in response to detecting a selection, via the user interface, of a respective communication reference of the communication references associated with the one listing from the visible content of the first advertisement displayed via the display device of the end-user device of the customer; and track leads to the entity, in response to updating an attribute stored by the server system based at least in part on the real-time communication connection between the end-user device associated with the customer and the end-user device associated with the respective entity, and comparing the attribute to a threshold specified for the entity.

22. The server system according to claim 21, the server system further executes the instructions to:

transmit content to facilitate presentation to the user interface of the display device, via the communication network, of a service of the entity of the plurality of entities associated with the one listing of the plurality of listings to the customer via the real-time communication connection.

* * * * *